(12) United States Patent
Diggs et al.

(10) Patent No.: US 8,316,099 B2
(45) Date of Patent: Nov. 20, 2012

(54) DIRECTORY DISTRIBUTOR

(75) Inventors: Bradley C. Diggs, Grand Prairie, TX (US); Thomas Sharif Abdallah, Erie, CO (US); Neil A. Wilson, Austin, TX (US); Stephen T. Shoaff, Austin, TX (US); Kelly C. Hemphill, Raleigh, NC (US)

(73) Assignee: Oracle America, Inc., Redwood City, CA (US)

( * ) Notice: Subject to any disclaimer, the term of this patent is extended or adjusted under 35 U.S.C. 154(b) by 2912 days.

(21) Appl. No.: 10/884,699

(22) Filed: Jul. 2, 2004

(65) Prior Publication Data

US 2005/0240553 A1    Oct. 27, 2005

Related U.S. Application Data

(60) Provisional application No. 60/564,100, filed on Apr. 21, 2004.

(51) Int. Cl.
*G06F 15/16* (2006.01)

(52) U.S. Cl. ........................ 709/217; 709/223

(58) Field of Classification Search .............. 709/203, 709/223, 224, 226, 217
See application file for complete search history.

(56) References Cited

U.S. PATENT DOCUMENTS

| | | | | |
|---|---|---|---|---|
| 6,249,836 B1* | 6/2001 | Downs et al. | ................. | 710/268 |
| 6,327,622 B1* | 12/2001 | Jindal et al. | ................. | 709/228 |
| 6,490,619 B1 | 12/2002 | Byrne et al. | | |
| 6,606,643 B1* | 8/2003 | Emens et al. | ................. | 709/203 |
| 6,629,105 B1 | 9/2003 | Young et al. | | |
| 6,643,690 B2* | 11/2003 | Duursma et al. | ............. | 709/217 |
| 6,681,251 B1* | 1/2004 | Leymann et al. | ............. | 709/226 |
| 2004/0003086 A1 | 1/2004 | Parham et al. | | |

* cited by examiner

*Primary Examiner* — Hussein A. Elchanti
(74) *Attorney, Agent, or Firm* — Brooks Kushman P.C.

(57) ABSTRACT

Dividing a set of leaf objects having the same path of a directory namespace allows the divided path data sets to be distributed over separate physical stores (e.g., directory servers, network storage, separate memory, etc.). Distribution of divided path data sets over separate physical stores enhances scalability of a directory namespace and facilitates efficient utilization of resources. A directory distributor maintains information that indicates distribution of data path sets of a directory namespace and directs requests for the directory namespace to appropriate stores in accordance with this information.

60 Claims, 17 Drawing Sheets

DIRECTORY NAMESPACE HIERARCHY
201

| LEAF OBJECT FIELD | WRITING SUPPLIER FIELD | WRITE ACK RECEIVED FIELD | TIME STAMP FIELD |
|---|---|---|---|
| DC=COMPANY, OU=PEOPLE, OU=CUSTOMERS, CN=111555888 | ALPHA-1 | 1 | 4:02:04.3 |
| ... | ... | ... | ... |
| DC=COMPANY, OU=PEOPLE, OU=CUSTOMERS, CN=555777999 | BETA-2 | 1 | 4:02:04.0 |
| DC=COMPANY, OU=PEOPLE, OU=CUSTOMERS, CN=888888888 | UNKNOWN | 0 | ----- |

DIRECTORY REQUEST AFFINITY TABLE
800

DIRECTORY DISTRIBUTOR

BACKGROUND

1. Field of the Invention

The present invention relates to the field of information processing systems. More specifically, the present invention relates to distributed directory information.

2. Description of the Related Art

Information directories are organized repositories of typically descriptive, attribute based information. An information directory may be an E-mail address directory, a telephone directory, a network directory, a public key directory, a company directory, etc. The International Standards Organization (ISO) and International Telecommunications Union (ITU) provided X.500 as a standard for organizing information directories and for directory services.

The complexity of the X.500 standard deters many organizations from implementing the entire standard. In response to the comprehensiveness of X.500, the lightweight data access protocol (LDAP) was developed.

LDAP is a set of protocols for accessing information directories. LDAP is based on some sections of X.500. In contrast to the X.500 standard that supports systems that conform to layer 7 of the OSI network reference model, LDAP supports systems that conform to layer 3/4 of the OSI network reference model. Universal Description, Discovery, and Integration (UDDI) is another directory related protocol. UDDI is a service discovery protocol for Web services.

LDAP and similar standards define a hierarchical directory information tree with different levels for each category of information. A directory information tree has a root node, which contains information about the host directory server. The root node references containers or subdirectories. A container or subdirectory may include additional containers, or may include objects (also referred to as entries, leafs, etc.), which is a basic storage element of the directory information tree. A unique identifier (UID) names each object of an information directory tree. An object's distinguished name (DN) identifies the path from the root to the object and the unique identifier for the object.

For example, assume a company maintains a directory information tree. The root node of the DIT indicates information about the directory server that hosts the DIT and the name of the company. The root node references two containers: 1) employees; and 2) customers. The employee container includes objects that indicate names, telephone numbers, and addresses of employees of the company. Likewise, the customer container includes objects that indicate the same information for customers of the company. The UID for each person, whether employee or customer, is their name. The DN for each customer would be the path to the customer object, which would include the company name (root node), the customer container, and the UID for the relevant customer.

Users that access DITs make read type requests and write type requests. Write type requests include create operations, update operations, etc. Read type requests include search operations, compare operations, etc. Organizations typically allow anonymous users to have read type access to their DITs. Organizations typically do not allow such liberal access for writing to their DITs. In addition, certain branches of a DIT may be restricted from categories of users, especially anonymous users. To access restricted information or to perform restricted operations, a user is authenticated to the directory server that hosts the target information. Typically a directory server hosts security credentials of those users authorized to access the information on the directory server.

Some DITs represent a massive amount of information. Storing all of the information for one of these large DITs overwhelms typical network resources. If a DIT includes hundreds of thousands of entries and is repeatedly accessed, performance of the host directory server suffers. In addition, throughput of the network conduit to the directory server is significantly impacted.

Instead of storing an entire DIT on a single directory server, a DIT can be partitioned. A DIT is partitioned according to the organization of the DIT. Using the previous example, an employee directory server hosts all of the employee objects and a customer directory server hosts all of the customer objects.

Unfortunately, DIT partitioning is confined by the organization of containers and does not address significant throughput and performance issues. Using the previous example, if there are a million customers and five hundred thousand employees for the company, partitioning the DIT still places a million objects on the customer directory server and half of a million objects on the employee directory server.

SUMMARY

Dividing a set of leaf objects having the same path of a directory namespace allows the divided path data sets to be distributed over separate physical stores. Distribution of divided path data sets over separate physical stores enhances scalability of a directory namespace and facilitates efficient utilization of resources. Leaf objects of a directory namespace are distributed in accordance with a given one or more distribution criteria. A representation of the distribution of leaf objects is utilizes to properly direct directory requests.

According to some embodiments of the invention, an application directs directory requests to respective ones of separate stores that represent different sets of leaf objects of a directory namespace hierarchy, based at least in part on a distribution criteria. The different sets of leaf objects have a same directory path in the directory namespace hierarchy and the different leaf objects of the directory namespace hierarchy are distributed among the separate stores according to the distribution criteria.

According to some embodiments of the invention, a method of processing directory requests for a distributed directory namespace comprises decoding at least part of a directory request to determine a value that corresponds to a distribution criteria. Sets of leaf objects having a same directory path in the directory namespace are distributed over separate stores in accordance with the distribution criteria. The method also comprises determining an appropriate one or more of the separate stores based at least in part on the value, and forwarding the directory request according to the determined appropriate one or more separate stores.

According to some embodiments of the invention, a method for servicing directory requests for a directory namespace comprises determining if a directory request indicates a value that corresponds to a distribution criteria of the directory namespace. The directory namespace includes sets of leaf objects that are distributed among separate stores according to the distribution criteria. The sets of leaf objects have a same directory path. The method also comprises mapping the value to a first of the sets of leaf objects.

According to some embodiments of the invention, a method comprises determining an appropriate one of a plurality of sets of leaf objects of a directory namespace for a directory request, the leaf objects of at least two of the plurality of sets of leaf objects having a same path in a directory namespace hierarchy. Each of the plurality of sets of leaf objects corresponds to a different one of a plurality of devices. The method also comprises forwarding the directory request to a first of the plurality of devices that corresponds to the determined appropriate one of the plurality of sets of leaf objects.

According to some embodiments of the invention, an apparatus comprises a set of one or more processors, and a means for associating directory requests with corresponding ones of a plurality of separately stored sets of leaf objects. At least two sets of the plurality of sets of leaf objects have a same path in a directory namespace.

According to some embodiments of the invention, a computer program product encoded on one or more machine-readable media comprises a first sequence of instructions to receive a directory request for a directory namespace, and a second sequence of instructions to direct the directory request to one of a plurality of separate stores, based at least in part on a value that corresponds to a distribution criteria. The directory namespace includes a plurality of leaf objects, which have a same directory path in the directory namespace, distributed over the plurality of separate stores.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 6A depicts an exemplary implementation of a data distribution table according to some realizations of the invention. FIG. 6B depicts an exemplary implementation of a single look up data distribution table according to some realizations of the invention.

FIG. 8 depicts an exemplary directory request affinity table according to some realizations of the invention.

FIG. 10A depicts update of a directory request affinity table with incoming write requests according to some realizations of the invention. FIG. 10B depicts processing read requests subsequent to write requests according to some realizations of the invention.

FIG. 13A depicts exemplary security information leaf objects according to some realizations of the invention. FIG. 13B depicts user-based organization of security information according to some realizations of the invention.

The use of the same reference symbols in different drawings indicates similar or identical items.

DESCRIPTION OF THE PREFERRED EMBODIMENT(S)

The description that follows includes exemplary systems, methods, techniques, instruction sequences and computer program products that embody techniques of the present invention. In particular, in some instances particular implementations suited to transactions, protocols, and services typical of servers such as those in accordance with Lightweight Data Access Protocol (LDAP), Universal Description, Discovery and Integration (UDDI), or the like, are described in some detail. However, it is understood that the described invention may be practiced without these specific details. In other instances, well-known protocols, structures and techniques have not been shown in detail in order not to obscure the invention.

Overview

Dividing a set of leaf objects having the same path of a directory namespace allows the divided path data sets to be distributed over separate physical stores (e.g., directory servers, network storage, separate memory, etc.). Distribution of divided path data sets over separate physical stores enhances scalability of a directory namespace and facilitates efficient utilization of resources. A directory distributor maintains information that indicates distribution of data path sets of a directory namespace and directs requests for the directory namespace to appropriate stores in accordance with this information. Directing requests from the directory distributor to the separate stores based on the type of request also increases efficient utilization of resources. The directory distributor tracks write requests for validating read requests, and directs validating read requests to the store that services the write request, thus reducing network traffic and providing reliable data. Since leaf objects are distributed over separate physical stores, a requestor's information may be hosted on a store that is separate from the store that hosts the leaf object of interest to the requestor. Creating a generic user account and mapping an authorized requestor to the generic user account, allows an authorized requester to access data over separate stores.

Distributing Divided Path Data Sets Over Separate Physical Stores

Figure 1:
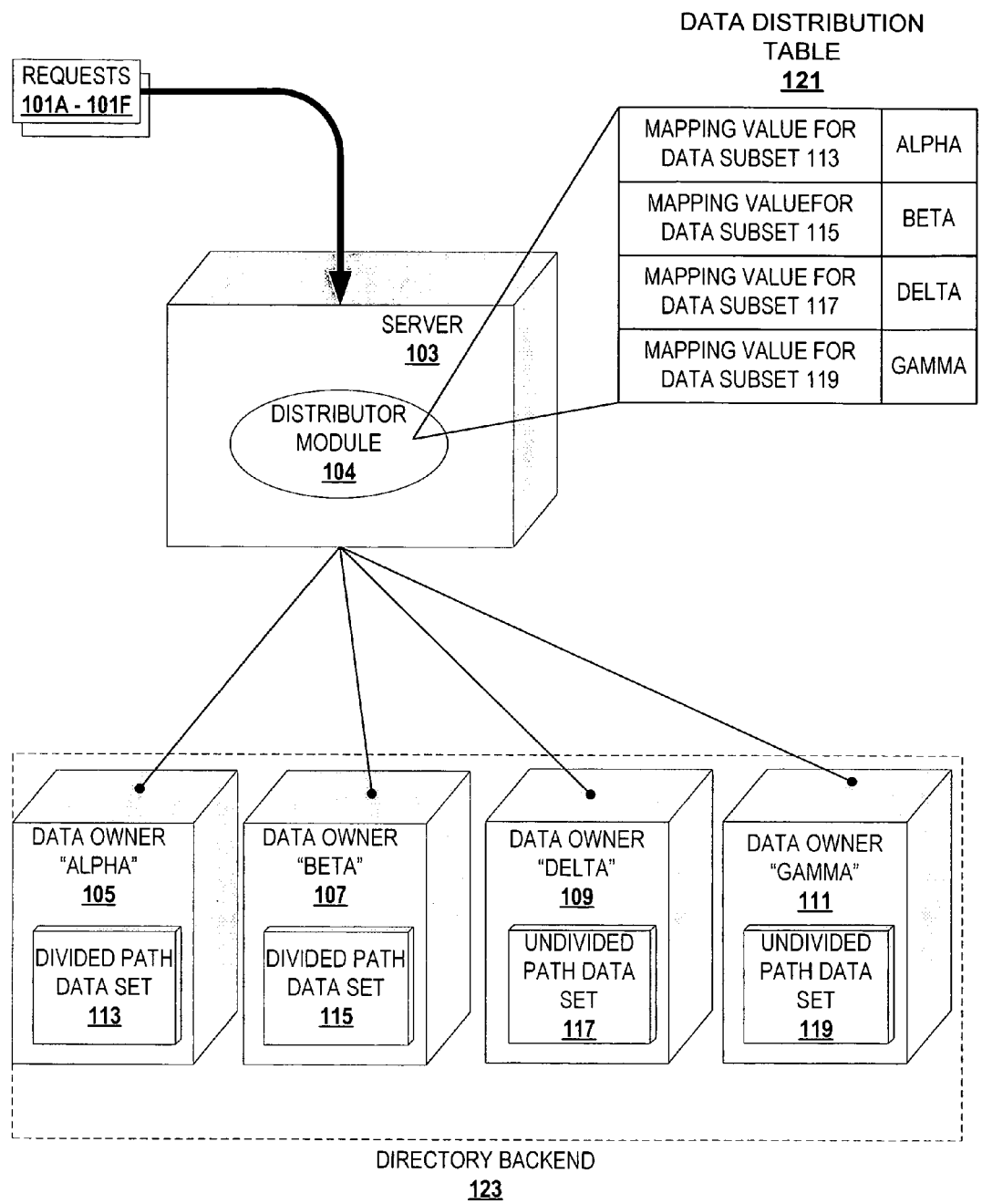
FIG. 1 is a conceptual diagram illustrating an exemplary directory distributor module according to one realization of the invention.

FIG. 1 is a conceptual diagram illustrating an exemplary directory distributor module according to one realization of the invention. In FIG. 1, a server 103 hosts a distributor module 104. The server 103 and the distributor module 104 process requests for a directory backend 123. The directory backend includes data owners 105, 107, 109, and 111, respectively referred to as Alpha, Beta, Delta, and Gamma.

The data owners Alpha 105, Beta 107, Delta 109, and Gamma 111 respectively host a divided path data set 113, a divided path data set 115, an undivided path data set 117, and an undivided path data set 119.

Figure 2:
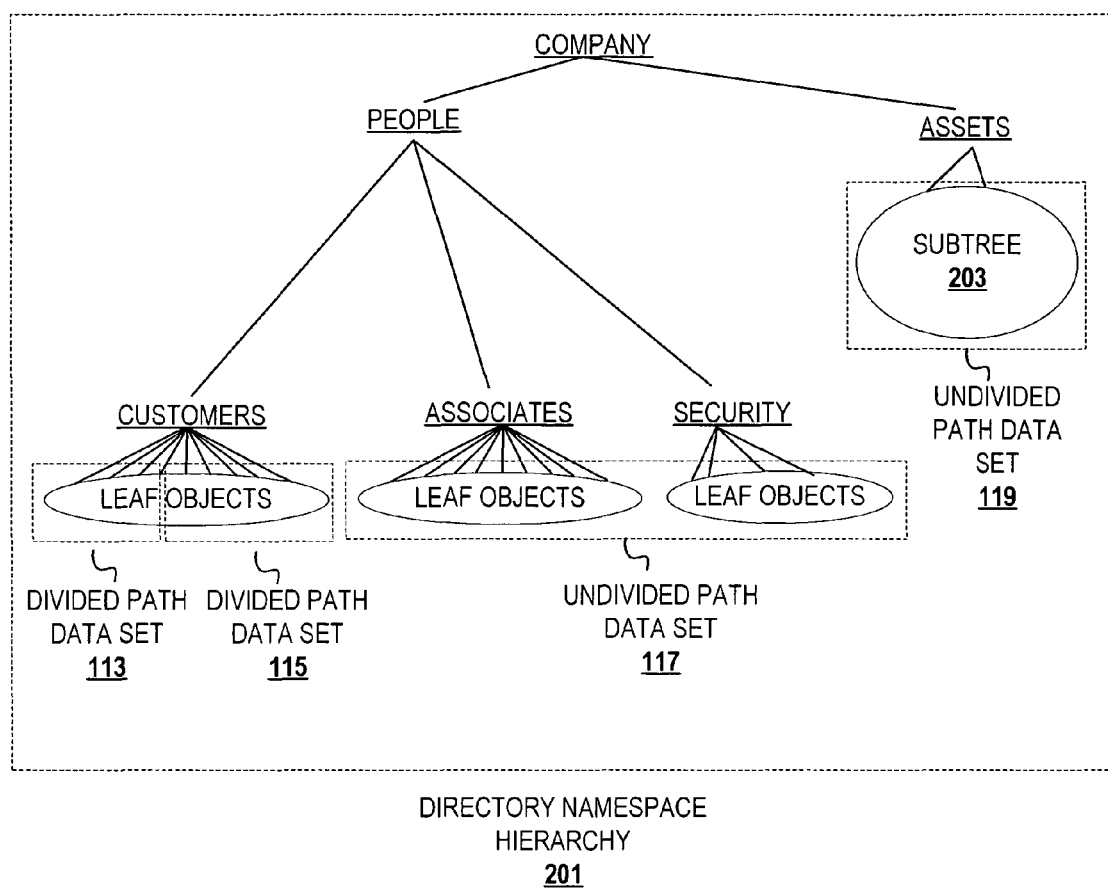
FIG. 2 is a graphical diagram that illustrates a distributed data set of a directory namespace hierarchy according to one realization of the invention.

FIG. 2 is a graphical diagram that illustrates a distributed data set of a directory namespace hierarchy according to one realization of the invention. A directory namespace hierarchy 201 has a root node COMPANY. The directory namespace hierarchy illustrated in FIG. 2 is implemented as a directory information tree, but various realizations of the invention implement the directory namespace according to different data structures. At the next level of the directory namespace hierarchy 201 are nodes PEOPLE and ASSETS. Below the node PEOPLE are nodes CUSTOMERS, ASSOCIATES, and SECURITY. The CUSTOMERS node includes leaf objects that are split into the divided path data set 113 and the divided path data set 115. If the unique identifier for these objects were last names, then in one example, the leaf objects are distributed based on last names (i.e., the last name is a distribution criteria). In this example, the divided path data set 113 includes all leaf objects identified with last names that begin with a letter from A-G, and the divided path data set 115 includes all leaf objects identified with last names that begin with a letter from H-Z. All of the leaf objects in the divided path data sets 113 and 115 have the same path names in the directory namespace hierarchy 201. The path for all leaf objects in the divided path data set 113 includes nodes COMPANY, PEOPLE, and CUSTOMERS. The path of the leaf objects in the divided path data set 115 includes the same nodes. Hence, leaf objects of multiple divided path data sets have the same path in a directory namespace hierarchy. Conversely, leaf objects of different undivided path data sets do not have the same data path, which is the conventional grouping of data sets.

The undivided path data set 117 includes all of the leaf objects under the nodes SECURITY and ASSOCIATES. The undivided path data set 119 includes all of the leaf objects in a subtree 203 that is below the node ASSETS. A directory namespace is divided for a range of reasons that include customer preferences, data layout, etc. For example, an administrator or designer may decide to divide the leaf objects having the path COMPANY->PEOPLE->CUSTOMERS because these leaf objects account for the largest percentage of leaf objects in the directory namespace hierarchy 201. Alternatively, or in addition, an administrator or designer may divides the nodes in the directory namespace hierarchy 201 for various reasons related to hardware resources, network resources, etc.

Referring to FIG. 1, the server 103 receives requests 101A-101F. The distributor module 104 processes the requests 101A-101F and accesses a data distribution table 121. The data distribution table 121 indicates location of data. In FIG. 1, the data distribution table 121 includes a first column of mapping values for associating or mapping attribute values of requests with a particular data set. The attribute values correspond to the distribution criteria for the directory namespace hierarchy. The data distribution table 121 includes a mapping value for each data set in the backend. Various techniques can be implemented to associate a request with a particular data set. For example, the mapping values can include one or more of hash values, individual characters, numbers, indices, etc. For example, if the data sets are distributed according to last names as in FIG. 2, the mapping values may be hashes of the first three letters of last names represented in each data set, a range of characters for last names represented in each data set, a single character, an integer that corresponds to a character, etc. In addition, distribution of a directory namespace hierarchy may be based on multiple distribution criteria and the mapping values would be one or more values corresponding to the combination of distribution criteria.

The data distribution table 121 also includes a second column of values indicating associated data owners of data sets. These data owner values may be network addresses, alphanumeric strings, references to network data structures, etc. The data distribution table 121 may also include additional information for transmitting the request, information for modifying the request, or possibly other information.

The distributor module 104 maps the requests 101A-101F to the appropriate data set in the data distribution table 121 with a mapping value and ascertains the data owner for the appropriate data set.

Figure 3:
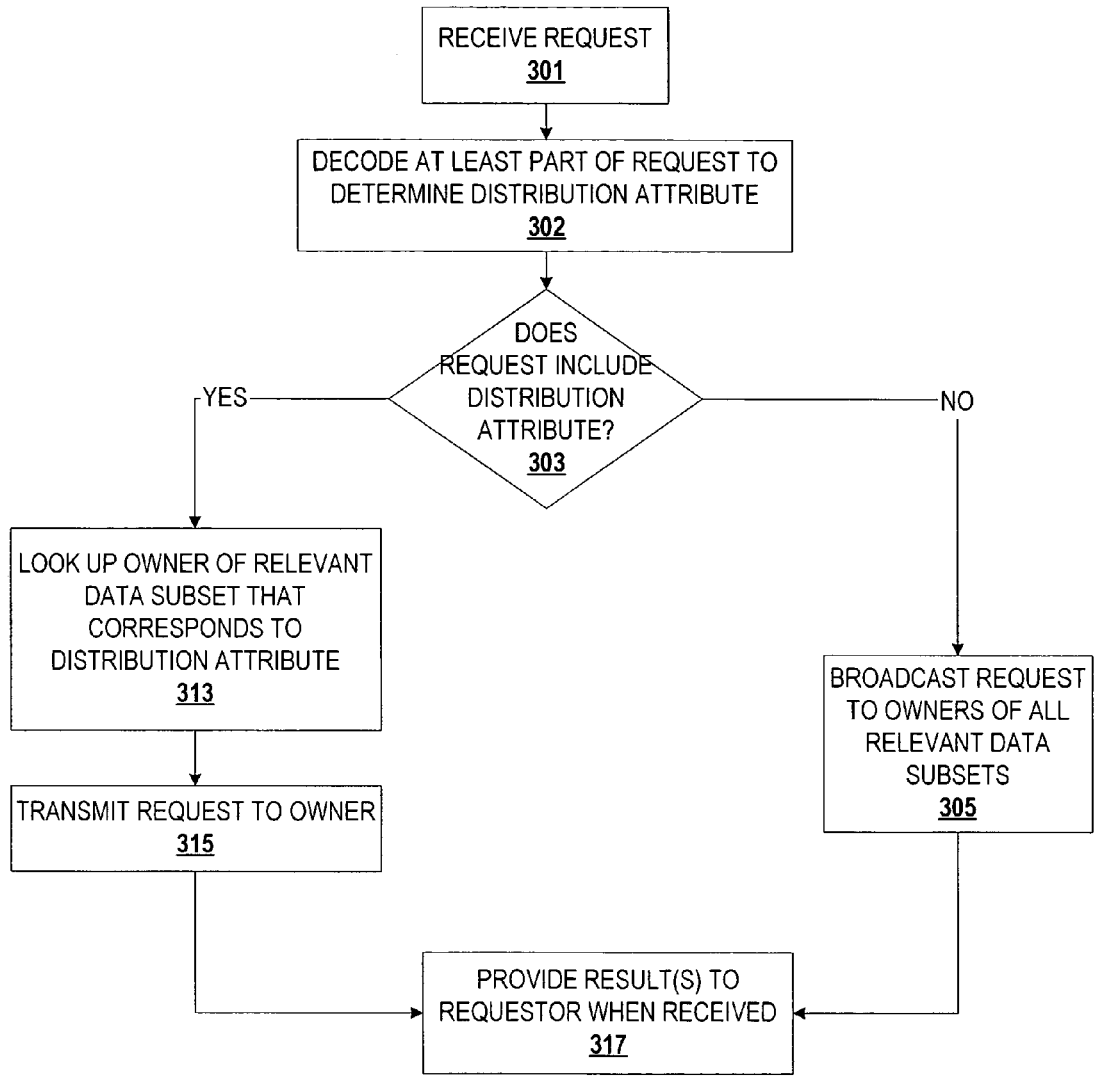
FIG. 3 is an exemplary flowchart for routing a request to the appropriate data set data owner according to some realizations of the invention.

FIG. 3 is an exemplary flowchart for routing a request to the appropriate data set data owner according to some realizations of the invention. At block 301, a request is received. At block 302, at least a part of the request is decoded to determine one or more distribution attributes (i.e., one or more attribute values that correspond to the directory namespace hierarchy distribution criteria). At block 303, it is determined if the request includes the distribution attribute. If the request includes the distribution attribute, then control flows to block 313. If the request does not include the distribution attribute, then control flows to block 305.

At block 305, the request is broadcast to the owners of all relevant data sets. For example, if it can be determined that the request corresponds to customers of the directory namespace hierarchy illustrated in FIG. 2, but the request does not include a last name, then the request is broadcast to all data owners of data sets of leaf objects under the node customers and not transmitted to data owners of other data sets. It may not be possible to determine relevant data sets, so the request is broadcast to all data owners. From block 305, control flows to block 317.

At block 313, the data owner of the relevant data set that corresponds to the distribution attribute is looked up. For example, logic, implemented as hardware, software, or a combination of hardware and software, maps the distribution attribute of the request to one of the entries in the data distribution table 121. At block 315, the request is transmitted to the data owner. At block 317, the result(s) are provided to the requestor when received from the data owner.

Dividing path data sets of a directory namespace hierarchy allow flexible implementation of a directory namespace hierarchy and facilitate optimal utilization of hardware and network resources for hosting and accessing the directory namespace hierarchy. A directory distributor, ranging from dedicated hardware to hosted software, routes requests of a directory namespace to appropriate data owners of data sets.

Directing Directory Requests Based on Request Type

Figure 4:
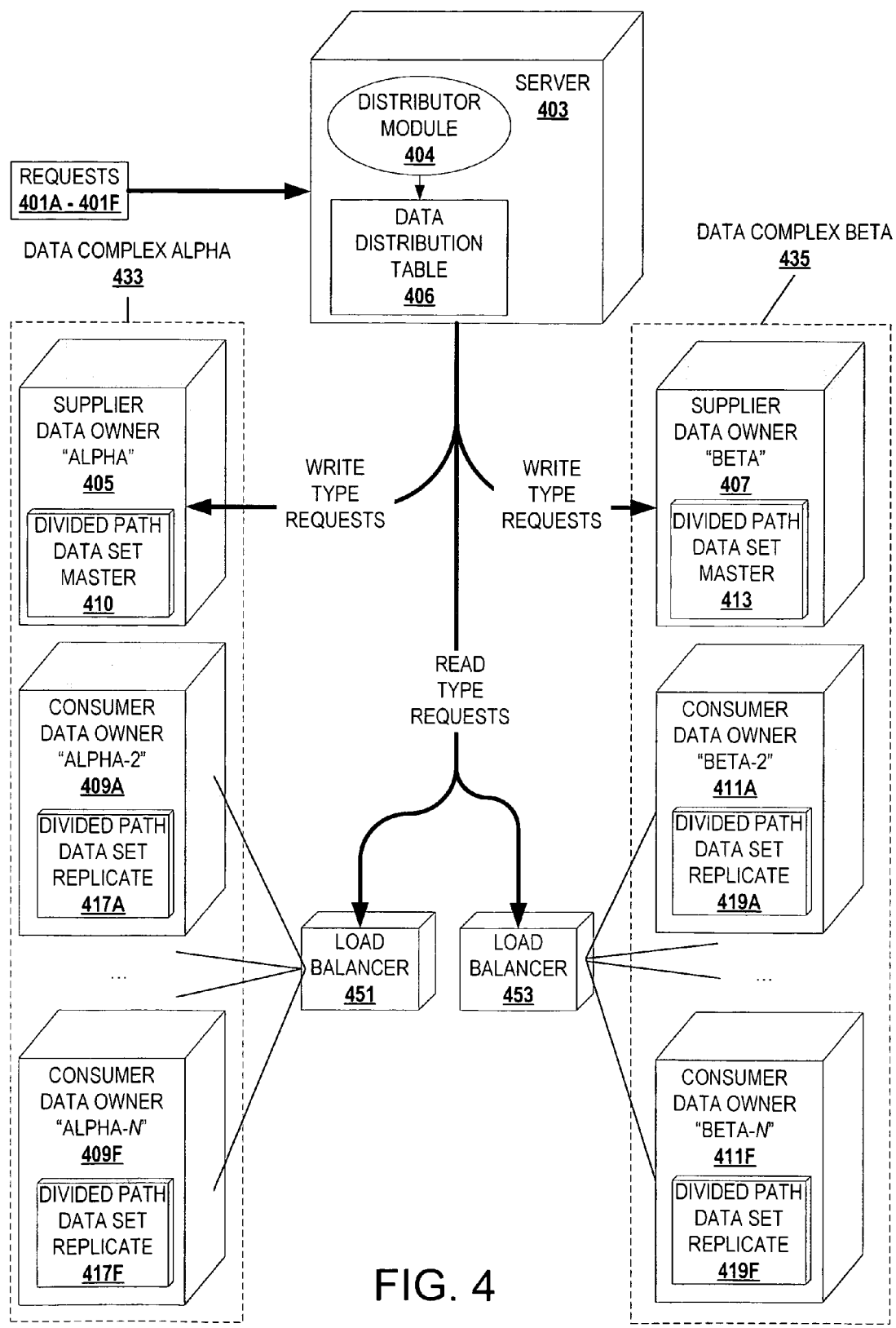
FIG. 4 depicts a directory distributor performing type based routing of requests to data complexes according to some realizations of the invention.

FIG. 4 depicts a directory distributor performing type based routing of requests to data complexes according to some realizations of the invention. A server 403 hosts a distributor module 404 and receives requests 401A-401F. The distributor module 404 accesses a data distribution table 406 to direct the requests 401A-401F to the appropriate data complexes.

A data complex Alpha 433 includes a supplier data owner 405, and consumer data owners 409A-409F. The supplier data owner 405 hosts a divided path data set master copy 410. The consumer data owners 409A-409F respectively host divided path data set replicates 417A-417F. A data complex Beta 435 includes a supplier data owner 407 and consumer data owners 411A-411F. The supplier data owner 407 hosts a divided path data set master copy 413. The consumer data owners 411A-411F respectively host divided path data set replicates 419A-419F.

The distributor module 404 directs write type directory requests to the supplier data owners 405 and 407. The distributor module 404 directs read type directory requests to load balancers 451 and 453. Although FIG. 4 illustrates load balancers 451 and 453 for load balancing traffic respectively to the consumers of the data complexes 433 and 435, various implementations of the invention transmit requests to consumers of data complexes differently (e.g., utilizing hardware load balancers, software load balancers in the distributor server, incorporating load balancing techniques into the distributor module 404, etc.). The supplier data owner 405 handles write type requests relevant to the hosted divided path data set master 410. Likewise, the supplier data owner 407 handles write type requests relevant to the hosted divided path data set master 413. The consumer data owners 409A-409F service read type requests relevant to the divided path data set of data complex 433 with replicate copies of the divided path data set. The consumer data owners 411A-411F service read type requests relevant to the divided path data set of data complex 435 with replicate copies of the divided path data set.

These consumer data owners service requests in parallel for their respective data complexes, thus handling a larger number of requests than a single consumer data owner without impacting time to service the request. Moreover, additional consumer data owners can be added to data complexes for hosting more replicates relatively easily in order to satisfy demand. With respect to the suppliers, resources of the suppliers 405 and 407 can be dedicated to servicing write type requests since resources are not consumed servicing read type requests. Directing requests based at least in part on the request type allows for efficient utilization of resources, scalability, and the capability to service requests of a directory namespace having a vast number of leaf objects.

Figure 5:
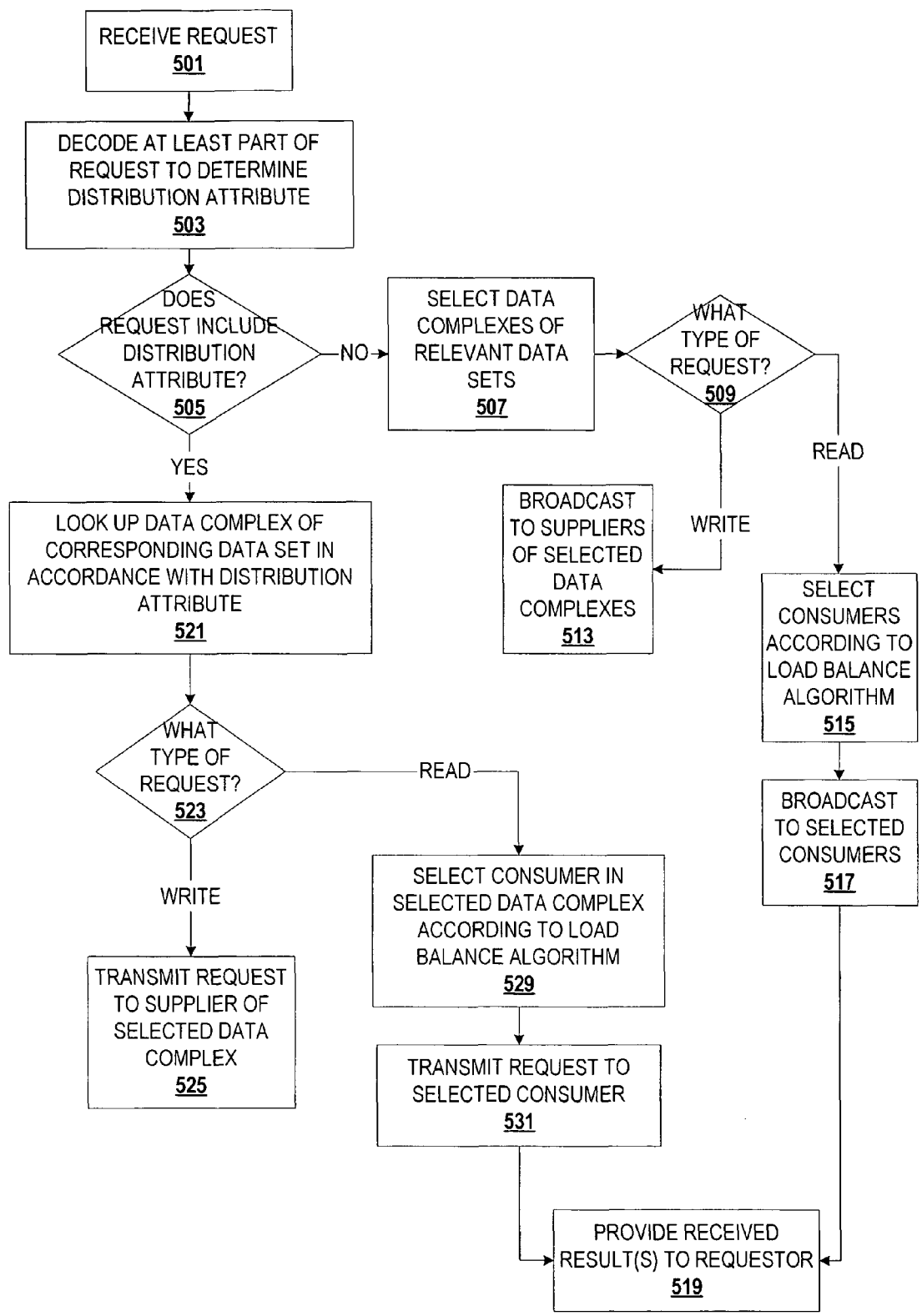
FIG. 5 is a flowchart that depicts type based directory request routing according to some realizations of the invention.

FIG. 5 is a flowchart that depicts type based directory request routing according to some realizations of the invention. At block 501, a request is received. At block 503, at least part of the request is decoded to determine a distribution attribute. At block 505, it is determined if the requests includes the distribution attribute. If the request does not include the distribution attribute, then control flows to block 507. If the request includes the distribution attribute, then control flows to block 521.

At block 507, data complexes of relevant data sets are selected. At block 509, the type of the request is determined. If the request is a read type request, then control flows to block 515. If the request is a write type request, then control flows to block 513.

At block 513, the write request is broadcast to suppliers of the selected data complexes.

At block 515, consumers of the selected data complexes are selected according to a load balancing algorithm. At block 517, the read request is broadcast to the selected consumers. In alternative realizations of the invention, the read request is broadcast to the selected data complexes and the read request is transmitted to a particular consumer of each data complex according to a load balancing mechanism at the front end of each data complex. It should be appreciated that a variety of techniques can be utilized for delivering requests to particular data owners in a variety of architectures (e.g., single consumer and single supplier model does not include load balancing, a single supplier multiple consumer model includes load balancer at the front end of the data complex or within the data distributor, and multiple supplier multiple consumer model includes load balancing at the data distributor, at the front end of each data complex, at both the front end of each data complex and within the data distributor, etc.). Control flows from block 517 to block 519.

At block 521, the data complex of the corresponding data set is looked up in accordance with the distribution attribute. At block 523, the request type is determined. If the request is a read request, then control flows to block 529. If the request is a write type request, then control flows to block 525.

At block 529, the consumer in the selected data complex is selected according to the load balancing algorithm. At block 531, the read request is transmitted to the selected consumer. At block 519, the received result(s) is provided to the requestor.

At block 525, the write request is transmitted to the supplier of the selected data complex.

Figure 6A:
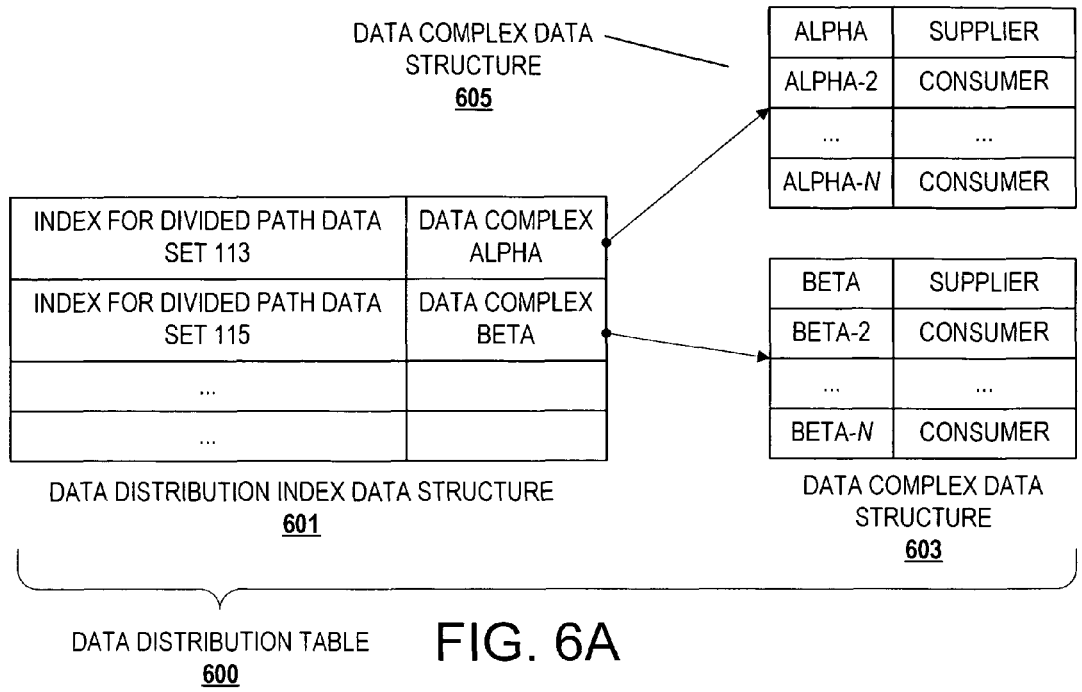
FIGS. 6A-6B depict exemplary data structures for type based directory request routing according to some realizations of the invention.
Figure 6B:
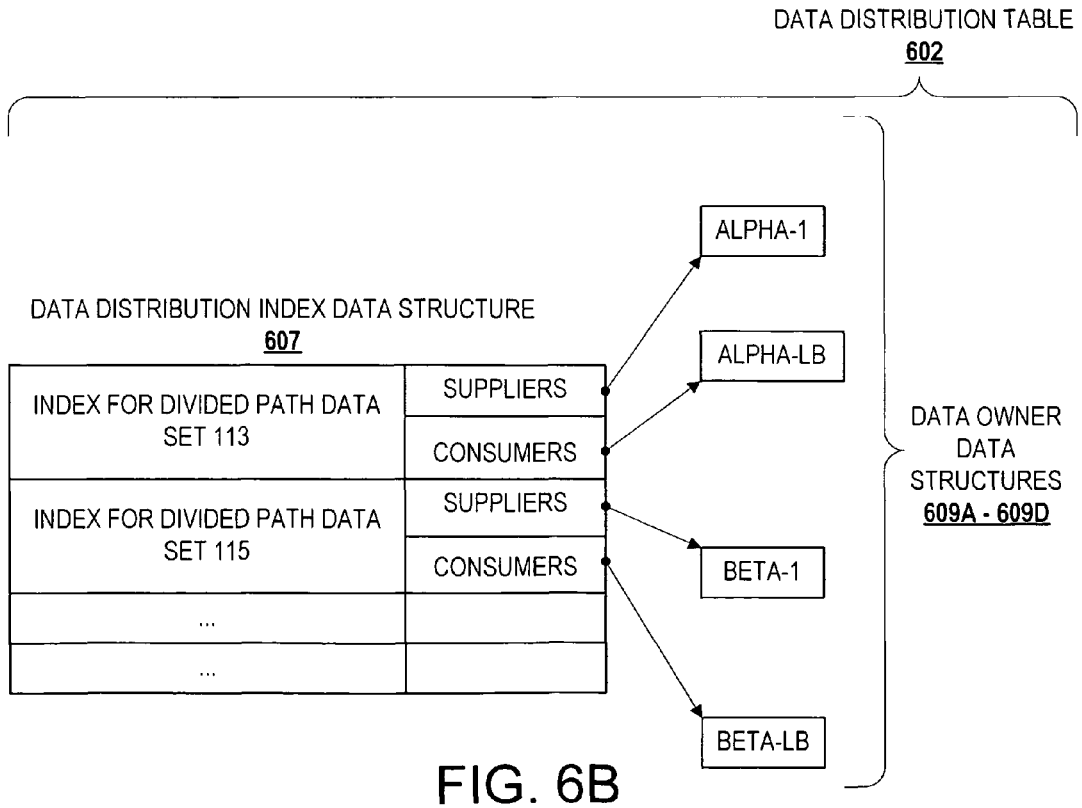

FIGS. 6A-6B depict exemplary data structures for type based directory request routing according to some realizations of the invention. FIG. 6A depicts an exemplary implementation of a data distribution table according to some realizations of the invention. A data distribution table 600 includes a data distribution index data structure 601, a data complex data structure 603, and a data complex data structure 605. The data distribution index data structure 601 includes a first column of indices that correspond to particular data sets. The data distribution index data structure 601 also includes a second column, which indicates data complexes. In FIG. 6A, the first entry of the data distribution index data structure 601 indicates an index for a divided path data set 113. The index for the divided path data set 113 is associated with or mapped to a data complex Alpha in the first entry. In the second entry, an index for the divided path data set 115 is associated with a data complex Beta.

The second column of the first entry references the data complex data structure 605. The data complex data structure 605 includes two columns. The first column of the data complex data structure 605 indicates members of the data complex described by the data complex data structure 605. Entries in the first column of the data complex data structure 605 indicate members Alpha, Alpha-2, and Alpha-N. The second column of the data complex data structure 605 indicates whether the corresponding data complex member is a supplier or a consumer. According to the data complex data structure 605, Alpha is a supplier, while members Alpha-2 and Alpha-N are consumers. The second column of the second entry of the data distribution index data structure 601 references the data complex data structure 603. The data complex data structure 603 describes the data complex Beta. As with the data complex data structure 605, the data complex data structure 603 includes two columns: a first column indicating members of the Beta data complex; and a second column indicating whether a member of the Beta data complex is a consumer or a supplier.

When a request is processed, the first column of the data distribution index data structure 601 is searched for an index value that corresponds to the distribution attribute of the request. Assuming the distribution attribute of the request maps to data complex Alpha, the data complex data structure 605 is searched based on the type of request. If the request is a write type request, then the data complex data structure 605 is searched for a supplier entry. The data complex data structure 605 indicates one supplier entry, which becomes the destination for the write request. If the request is a read type request, then the data complex data structure 605 is searched for a consumer entry. The data complex data structure 605 indicates multiple consumer entries. Various techniques can be employed for selecting one of the consumers as the destination for the read request (e.g., the data complex data structure includes a flag to identify which of the consumers should be selected for a particular read request, all of the consumers are input into a load balancing mechanism that selects one of the consumers, the reference to the list of consumers is modified at given times in accordance with a load balancing mechanism, the reference points to a first consumer in the data complex data structure and the list is reordered in accordance with a load balancing algorithm, etc.). These various techniques can also be applied for selecting a supplier if a data complex includes multiple suppliers.

FIG. 6B depicts an exemplary implementation of a single look up data distribution table according to some realizations of the invention. A data distribution table 602 includes a data distribution index data structure 607 and data owner data structures 609A-609D. Each entry of the data distribution index data structure 607 includes an index field, a supplier reference field, and a consumer reference field. The first and second entries of the data distribution index data structure 607 respectively indicate an index for divided path data set 113 and an index for divided path data set 115. The suppliers field of the first entry references the data owner data structure 609A, which indicates a supplier for a data complex Alpha. The consumers field of the first entry references the data owner data structure 609B, which indicates a load balancer for the consumers of the data complex Alpha. The suppliers field of the second entry references the data owner data structure 609C, which indicates a supplier for a data complex Beta. The consumers field of the second entry references the data owner data structure 609D, which indicates a load balancer for the consumers of the data complex Beta.

When a request is processed, the data distribution index data structure 607 is searched for an entry that corresponds to the request being processed. Once a corresponding entry is located, the suppliers field is followed if the request is a write type request and the consumers field is followed if the request is a read type request.

Realizations of the invention utilize any of a number of data structures or combinations of data structures (e.g., hash tables, binary search trees, tries, arrays, etc.) to maintain information for directing requests. Furthermore, realizations of the invention implement data structures in hardware according to any one or more of different techniques (e.g., content addressable memory, random access memory, a combination of CAM and RAM, hardware lookup tables, etc.).

Directory Request Affinity

Although directing read requests and write requests to different data owners allows for efficient service of requests, improved resource utilization, and architecture flexibility, directing certain sequences of requests differently facilitates servicing requests without stale data. In particular, read requests are sometimes submitted to validate write requests. At times, the latency to propagate changes to a directory namespace over separate stores is greater than the time to receive and service validating read requests. For example, a user submits a write request soon followed by a validating read request, but the read request and the write request are directed to different data owners. If the read request is serviced before the change to the directory namespace from the write request is replicated to the data owner servicing the read request, then the user is provided a result that is based on stale data. Tracking write requests allows validating read requests to be directed to the appropriate data owner.

FIG. 7 depicts a flowchart for processing a validating read request according to some realizations of the invention. At block 701, a request is received. At block 703, at least part of the received request is decoded to determine a distribution attribute. At block 705, it is determined if the request includes the distribution attribute. If the request does not include the distribution attribute, then control flows to block 707. If the request includes the distribution attribute, then control flows to block 721.

At block 707, data complexes of data sets that are relevant to the received request are selected. At block 709, the request type is determined. If the request is a write request, then control flows to block 711. If the request is a read request, then control flows to block 745 of FIG. 7B.

At block 711, the received request is broadcast to suppliers of the selected data complexes. At block 715, an affinity table is updated upon receiving acknowledgment for the write request. The affinity table tracks write requests and the suppliers that service the write requests. An example affinity table is illustrated in FIG. 8.

At block 721, the data complex of the corresponding data set is looked up in accordance with the distribution attribute. At block 723, the request type is determined. If the request is a write request, the control flows to block 725. If the request is a read request, then control flows to block 731 of FIG. 7B.

At block 725, the received request is transmitted to the supplier of the data complex. Control flows from block 725 to block 715.

Figure 7A:
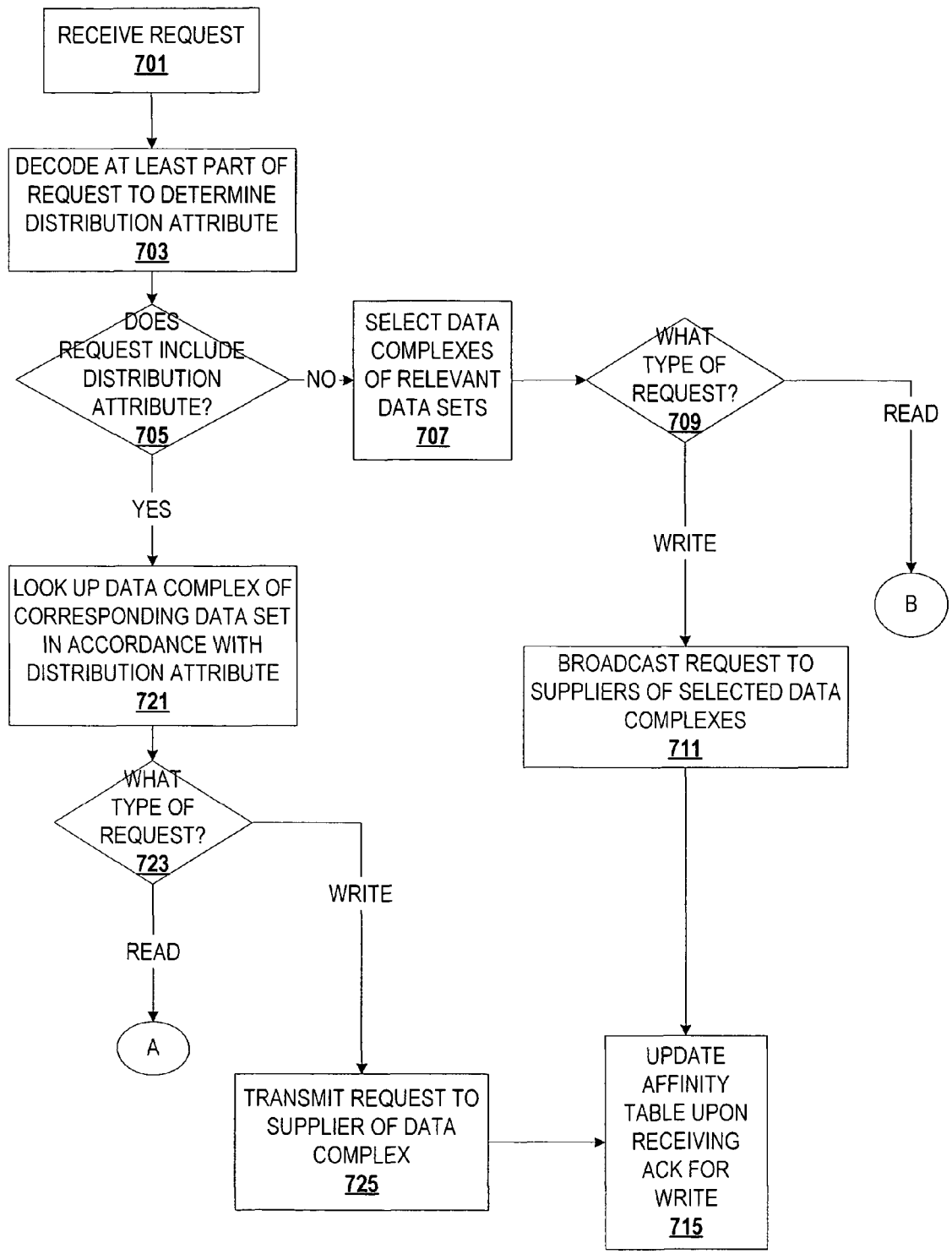
FIG. 7 depicts a flowchart for processing a validating read request according to some realizations of the invention.
Figure 7B:
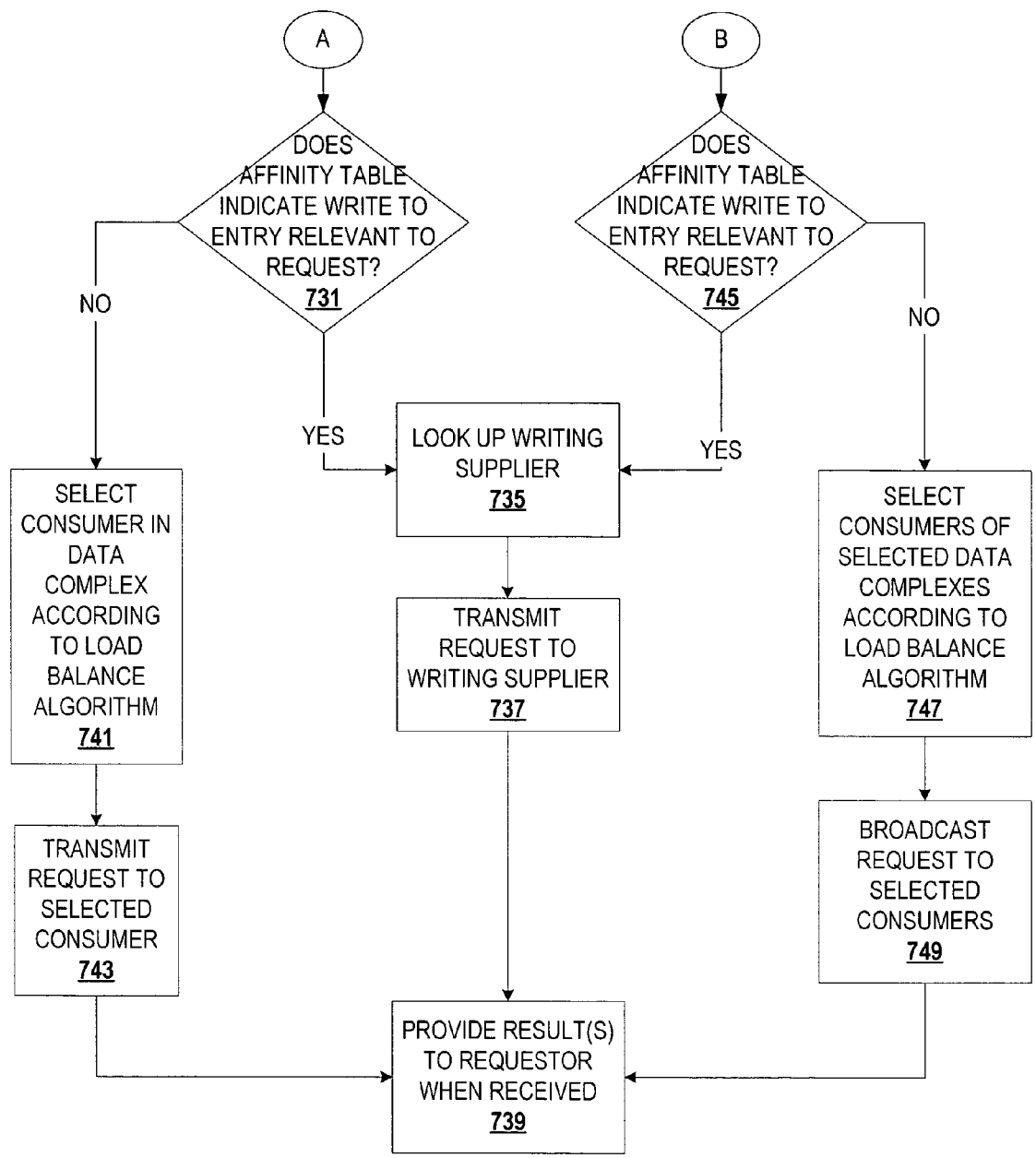

FIG. 7B depicts a flowchart continuing from FIG. 7A for processing validating read requests according to some realizations of the invention. At block 745, it is determined if the affinity table indicates a write request entry that is relevant to the received request. If the affinity table does not indicate such a write request, then control flows to block 747. If the affinity table indicates such a write request, then control flows block 735.

At block 747, the consumers of selected data complexes are selected according to a load balance algorithm. At block 749, the request is broadcast to the selected consumers. At block 739, the result(s) are provided to the requestor when received.

At block 731, it is determined if the affinity table indicates a write request entry that is relevant to the received request. If the affinity table does not indicate such a write request, then control flows to block 741. If the affinity table indicates such a write request, then control flows to block 735.

At block 741, a consumer in the data complex is selected according to the load balance algorithm. At block 743, the request is transmitted to the selected consumer. Control flows from block 743 to block 739.

FIG. 8 depicts an exemplary directory request affinity table according to some realizations of the invention. A variety of techniques are available for implementing the directory request affinity table, but FIG. 8 illustrates an example of an implementation of a data request affinity table to aid in understanding the described invention. Each entry of a directory request affinity table 800 includes a leaf object field, a writing supplier field, a write ACK received field, and a timestamp field. Various realizations of the invention may include additional or fewer fields than those illustrate in FIG. 8. The leaf object field of each entry in the directory request affinity table 800 indicates a particular leaf object (e.g., UID, distinguished name, etc.) within a directory namespace hierarchy. The writing supplier field of each entry indicates the data owner that is responsible for servicing the write requests corresponding to the indicated leaf object. The write ACK received field indicates whether or not acknowledgment has been received for a particular write request. The write ACK received field can be utilized in various manners (e.g., indicating that a write request has been serviced, indicating that replication of data modified by the write request has been started or completed, etc.). The timestamp field indicates the time when the write request was transmitted. The timestamp field can be utilized for garbage collection or expiration type operations. For example, after a given amount of time has passed since the write request was serviced, the entry in the directory request affinity table is cleared. Various realizations of the invention clear entries in a directory request affinity table differently (e.g., after expiration of a predefined limit related to propagation delay, after expiration of a dynamically adjusted limit related to propagation delay, after verification of replication, etc.).

Figure 9:
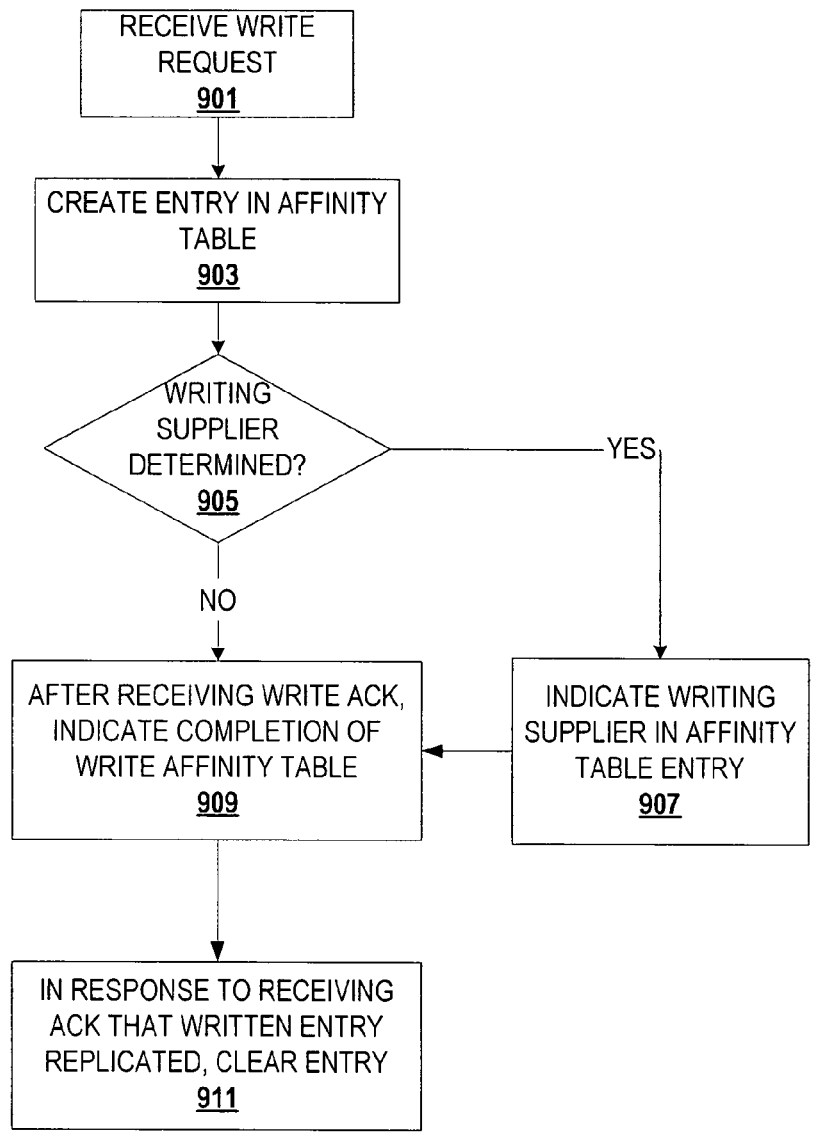
FIG. 9 is a flowchart that depicts maintenance of a directory request affinity table according to some realizations of the invention.

FIG. 9 is a flowchart that depicts maintenance of a directory request affinity table according to some realizations of the invention. At block 901, a write request is received. At block 903, an entry is created in the affinity table. The block 905, the supplier that performs the write request is determined. The supplier may be determined before transmission of the write request, after transmission of the write request, after receiving acknowledgment from a supplier, etc. If the writing supplier cannot be determined yet, then control flows to block 909. If the writing supplier can be determined, then control flows to block 907.

At block 907, the writing supplier is indicated in the affinity table entry. The control flows from block 907 to block 909. At block 909, completion of the write request is indicated in the affinity table entry after receiving a write acknowledgment. At block 911, the entry is cleared in response to receiving acknowledgment that the written entry has been replicated. In some realizations of the invention, the entry is not cleared until a later point in time and instead an element of the entry is set to indicate whether the entry should be cleared, skipped, etc.

Figure 10A:
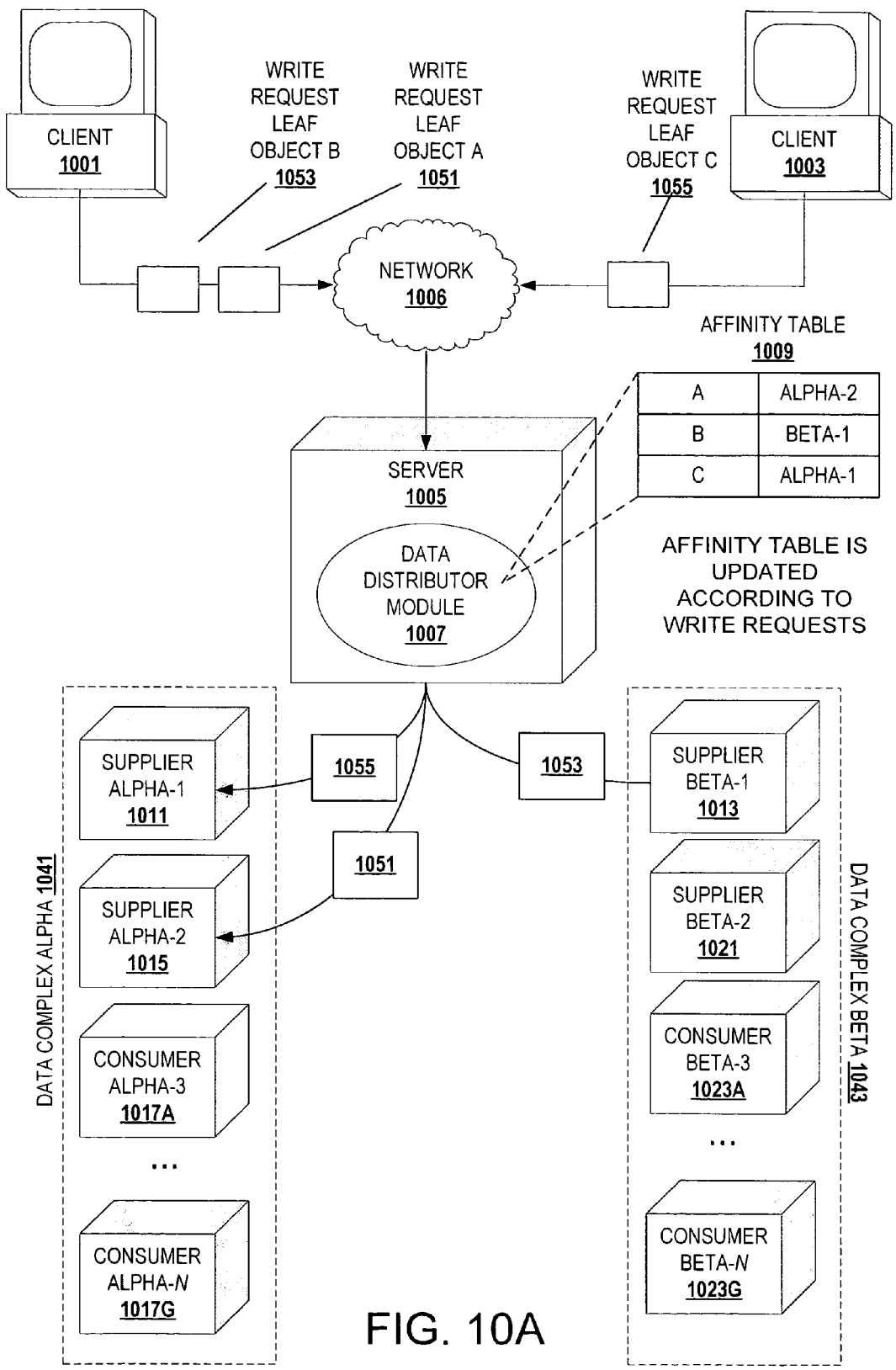
FIGS. 10A-10B depict direction of validating read requests according to some realizations of the invention.
Figure 10B:
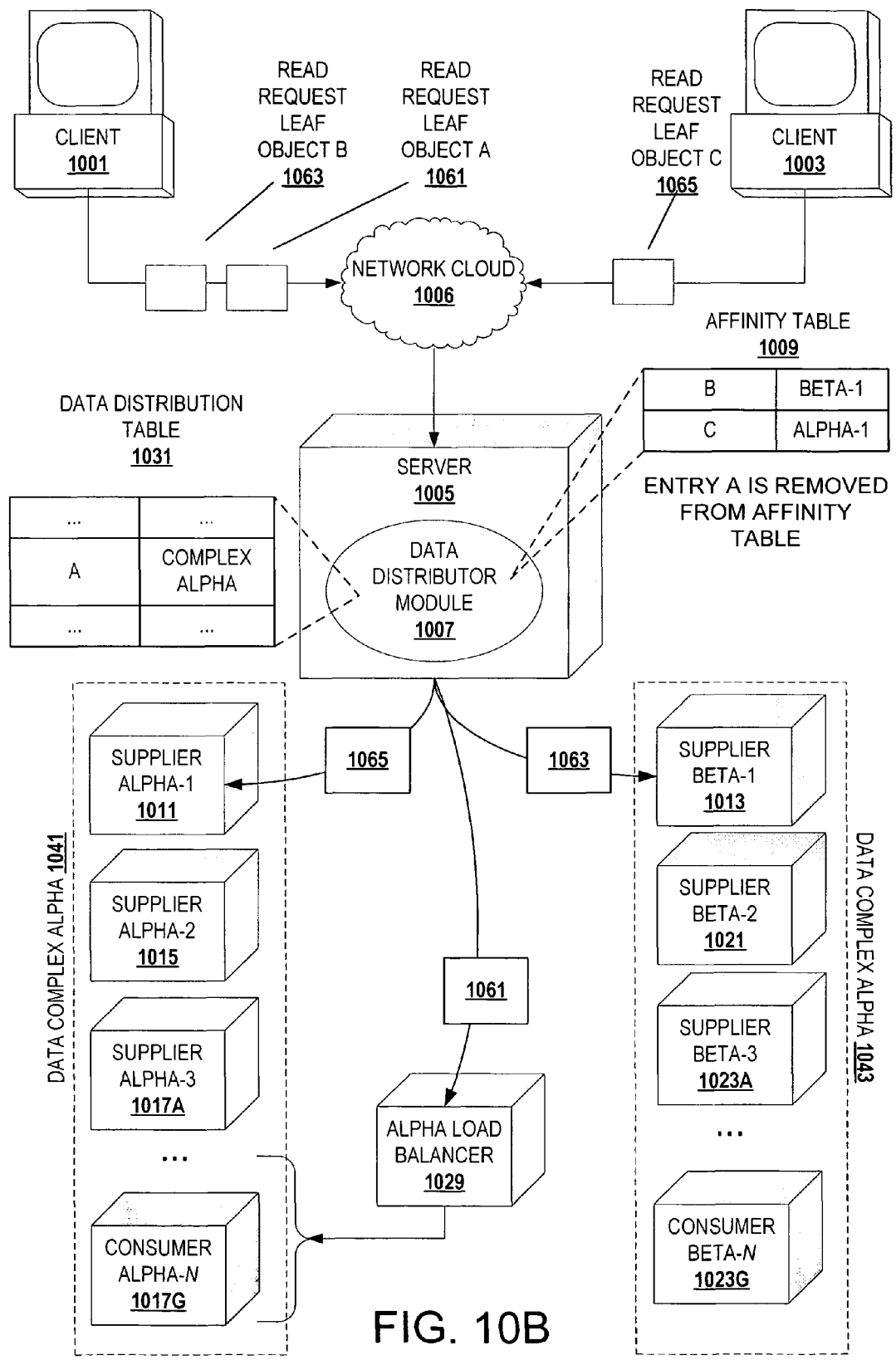

FIGS. 10A-10B depict direction of validating read requests according to some realizations of the invention. FIG. 10A depicts update of a directory request affinity table with incoming write requests according to some realizations of the invention. Clients 1001 and 1003 are coupled with a server 1005 via a network 1006. The client 1001 submits to the server 1005 a write request 1053 for a leaf object B and a write request 1051 for a leaf object A. The client 1003 submits to the server 1005 a write request 1055 for a leaf object C.

The server 1005 hosts a data distributor module 1007, which accesses the directory request affinity table 1009. The distributor module 1007 directs requests to data complexes Alpha 1041 and Beta 1043. The data complex Alpha 1041 includes a supplier 1011, a supplier 1015, and consumers 1017A-1017G. The data complex data 1043 includes a supplier 1013, a supplier 1021, and consumers 1023A-1023G.

The data distributor module 1007 updates the directory request affinity table 1009 to reflect processing of the write requests 1051, 1053, and 1055. Various realizations of the invention indicate the leaf objects differently (e.g., hash of the UID of the leaf object, an alphanumeric string representation of the leaf object's UID, a hash of the leaf object's DN, a hash of the leaf object's DN, a representation of the UID and the path, a system identifier associated with the leaf object, a combination of the session identifier and the UID, a requestor identifier, a combination of the requester identifier, the session identifier and the UID, etc.). The write request 1055 is transmitted to the supplier 1011 of the Alpha data complex. The write request 1051 is transmitted to the supplier 1015 of the Alpha data complex. The write request 1053 is transmitted to the supplier 1013 of the Beta data complex.

FIG. 10B depicts processing read requests subsequent to write requests according to some realizations of the invention. In FIG. 10B, The client 1001 submits a read request 1063 for the leaf object B and a read request 1061 for the leaf object A. The client 1003 submits a read request 1065 for leaf object C.

The data distributor module 1007 consults the directory request affinity table 1009. The directory request affinity table 1009 indicates that Beta-1, which is the supplier 1013, hosts data relevant to a validating read for leaf object B, and that data owner Alpha-1, which is the supplier 1015, hosts data relevant to a validating read for leaf object C. The directory request affinity table 1009 does not include an entry that indicates leaf object A. The data distributor module 1007 consults its data distribution table 1031 to determine where to direct the read request 1061. The data distribution table 1031 indicates that the Alpha data complex 1041 hosts data relevant to the read request 1061. The validating read requests 1063 and 1065 are respectively transmitted to the supplier 1013 and the supplier 1011 in accordance with the directory request affinity table 1009. However, the validating read request 1061 is transmitted to a load balancer 1029 for the Alpha data complex 1041 in accordance with the data distribution table 1031. The users of the clients 1001 and 1003 will be able to validate their write requests because the responses to their read requests are based on up-to-date data. Besides providing reliable data, tracking write requests and their writing suppliers reduces network traffic resulting from repeated transmission of validating read requests during propagation delay. In addition, users typically end their session upon receiving a response that validates their write request, thus resources used for sessions are freed.

Mapping Generic User Accounts

Just as a read request and a write request for the same leaf object may be serviced by different data owners, a requestor's account information and the requested data may be stored on separate data owners. Creating generic user accounts on each separate store and mapping authorized requesters to these separate stores avoids performance of redundant authorization operations and provides access flexibility.

Figure 11:
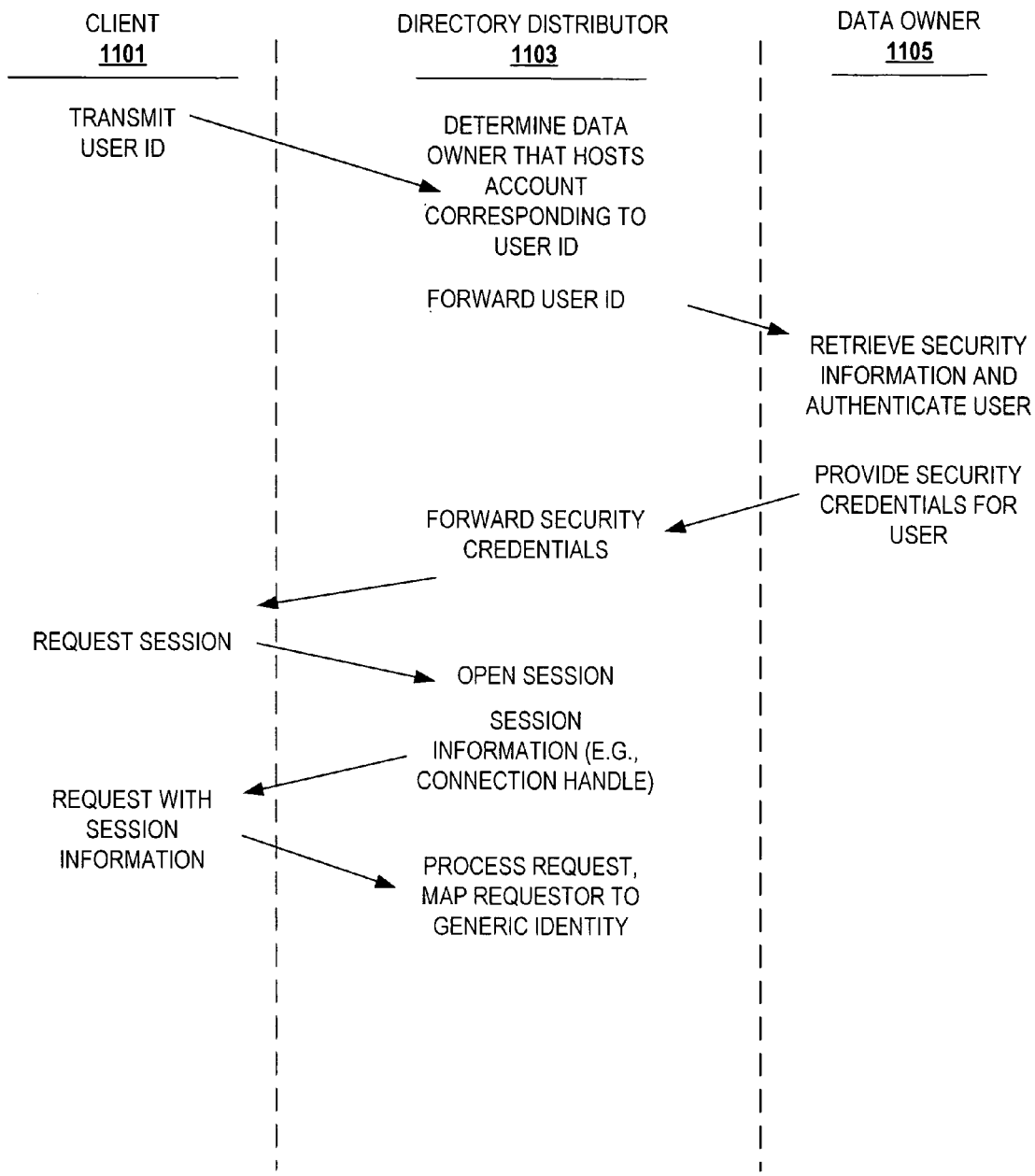
FIG. 11 depicts a directory distributor controlling access to data owners hosting a directory namespace according to some realizations of the invention.

FIG. 11 depicts a directory distributor controlling access to data owners hosting a directory namespace according to some realizations of the invention. A client 1101 transmits a user ID to a directory distributor 1103. The directory distributor 1103 determines which data owner hosts the account corresponding to the user ID. The directory distributor 1103 forwards the user ID to the determined data owner. A data owner 1105 receives the user ID and retrieves the relevant account information, which includes security information. The data owner 1105 authenticates the user. After authenticating the user, the data owner 10S provides security credentials for the user. The data owner 1105 transmits these security credentials to the directory distributor 1103. The directory distributor forwards the security credentials to the client 1101. The client 1101 transmits a session request to the directory distributor 1103. The directory distributor 1103 opens a session with the requesting client 1101 and provides session information (e.g., connection handle) to the requesting client 1101. The client 1101 transmits a directory request to the directory distributor 1103 with the provided session information. The directory distributor 1103 processes the request and, if relevant, maps the requester to a generic identity.

Figure 12:
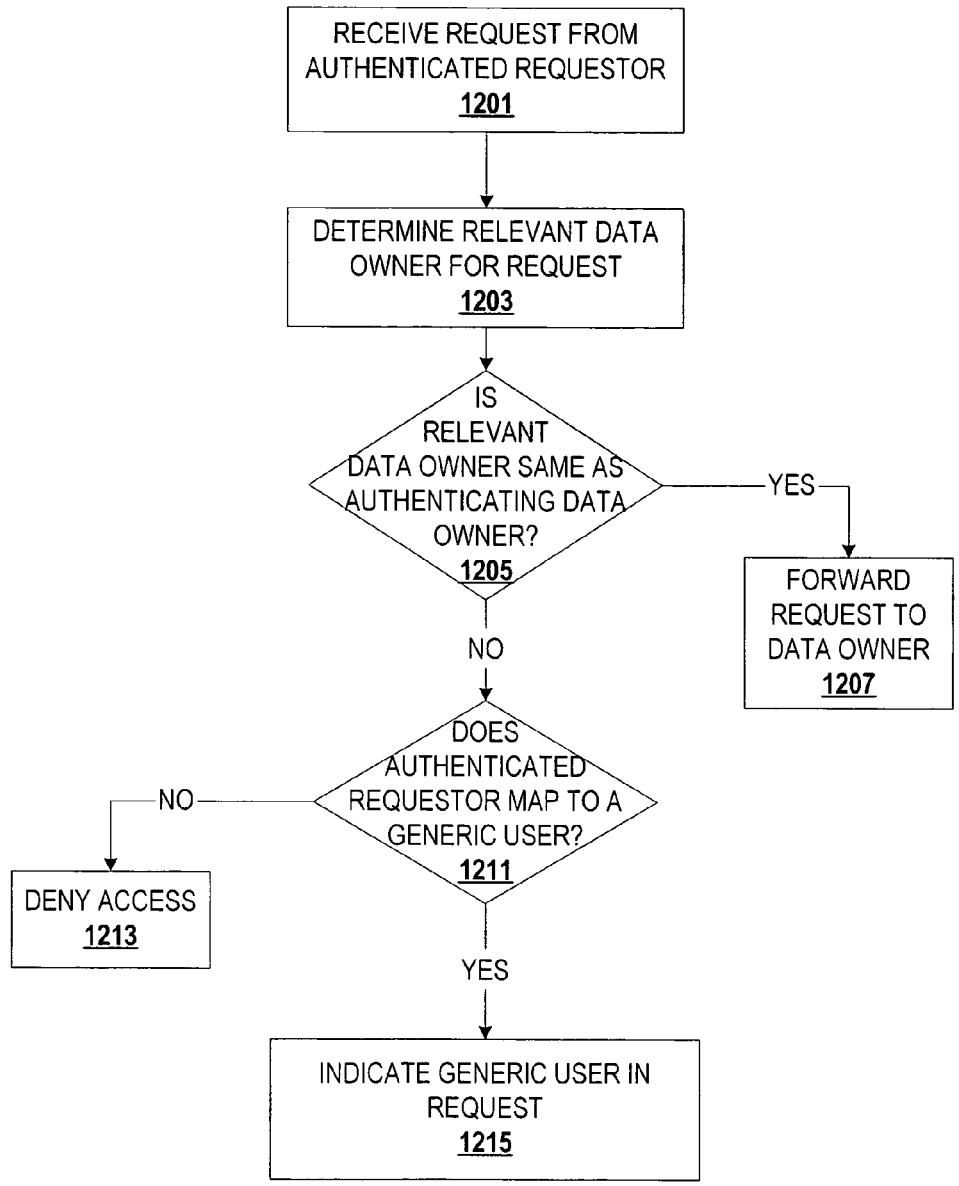
FIG. 12 depicts a flowchart for determining support of generic user account mapping according to some realizations of the invention.

FIG. 12 depicts a flowchart for applying generic user account information according to some realizations of the invention. At block 1201, a request is received from an authenticated requester. At block 1203, the relevant data owner for the request is determined. At block 1205, it is determined if the relevant data owner is the authenticating data owner. If the data owners are the same, then control flows to block 1207. If the data owners are not the same, then control flows to block 1211.

At block 1207, the request is forwarded to the data owner.

At block 1211, it is determined if the authenticated requestor maps to a generic user. For example, an entry for the requestor includes a distinguished name that indicates a generic identity, the class of service for the requestor indicates the generic identity, etc. If the authenticated requester does not map to a generic user, then control flows to block 1213. If the authenticated requester maps to the generic user, then control flows to block 1215.

At block 1213, access is denied.

At block 1215, the generic user is indicated in the request. For example, in a proxied authorization control field, the generic user identity is indicated. In addition to authenticated users, realizations of the invention provide generic user identities to unauthenticated requesters. For example, users are permitted to access to a directory for read only purposes without authentication. Furthermore, realizations of the invention provide for default mappings of authenticated requestors to a first set of one or more generic identities and default mappings of unauthenticated requestors to a second set of one or more generic identities.

Figure 13A:
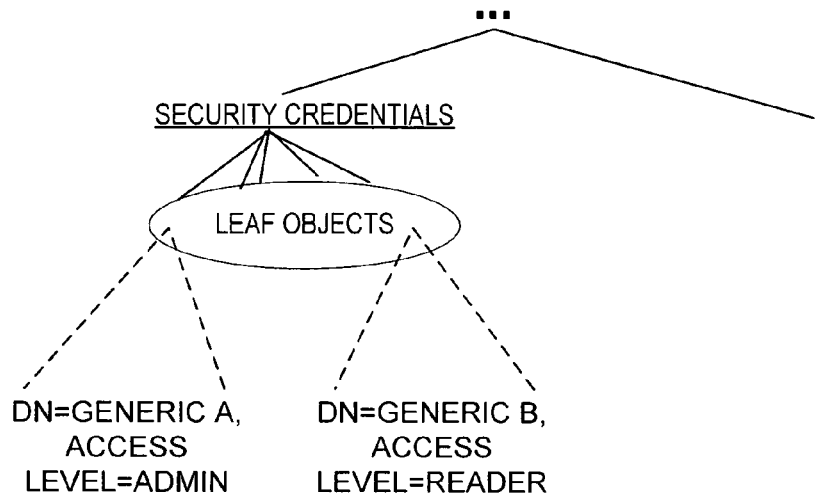
FIGS. 13A-13B depict organization of security information according to some realizations of the invention.
Figure 13B:
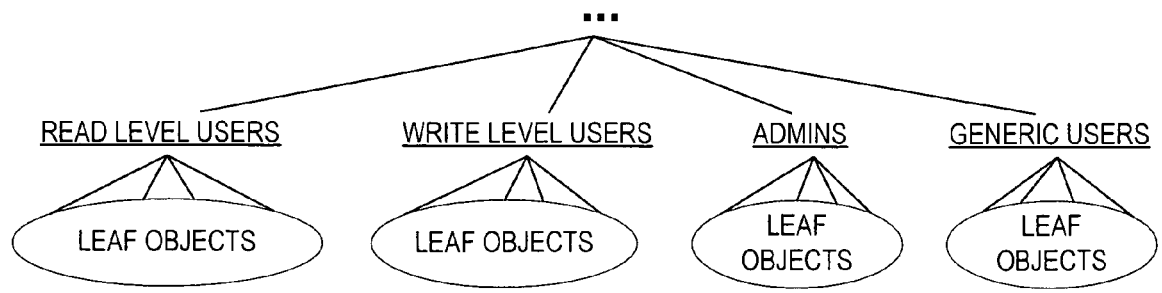

FIGS. 13A-13B depict organization of security information according to some realizations of the invention. FIG. 13A depicts exemplary security information leaf objects according to some realizations of the invention. In FIG. 13A, a directory namespace hierarchy includes a node SECURITY CREDENTIALS. The node SECURITY CREDENTIALS includes a number of leaf objects. A first leaf object is illustrated as having an attribute CN=Generic A. The first leaf object is illustrated as also having an attribute Access Level=Admin. A second leaf object contained in the node SECURITY CREDENTIALS is illustrated as having an attribute CN=Generic B and an attribute Access Level=Reader. Various realizations of the invention map authenticated users to generic accounts with different techniques. For example, an authenticated user may map to generic B based on a match between access levels (i.e., the authenticated user has a read access level which is the same as generic B's access level).

FIG. 13B depicts user-based organization of security information according to some realizations of the invention. In FIG. 13B, the following four nodes exist at the same level in a directory namespace hierarchy: READ LEVEL USERS, WRITE LEVEL USERS, ADMINS, AND GENERIC USERS. Each of these nodes contain leaf objects with security information for user accounts. A variety of techniques can be utilized for adding generic user accounts to directory namespace. The generic account may be grouped separately, grouped into access level nodes, etc. Creating a set of one or more generic user accounts in each of the separate data owners allows flexible requestor access and management of security information. For example, all of the security credentials for an organization may be stored on a single security directory server or distributed over multiple security directory servers, and all requesters of data on non-security directory servers will be mapped to generic accounts on the non-security directory servers hosting data of the directory namespace.

User authorization also includes request type based restriction of access.

Figure 14:
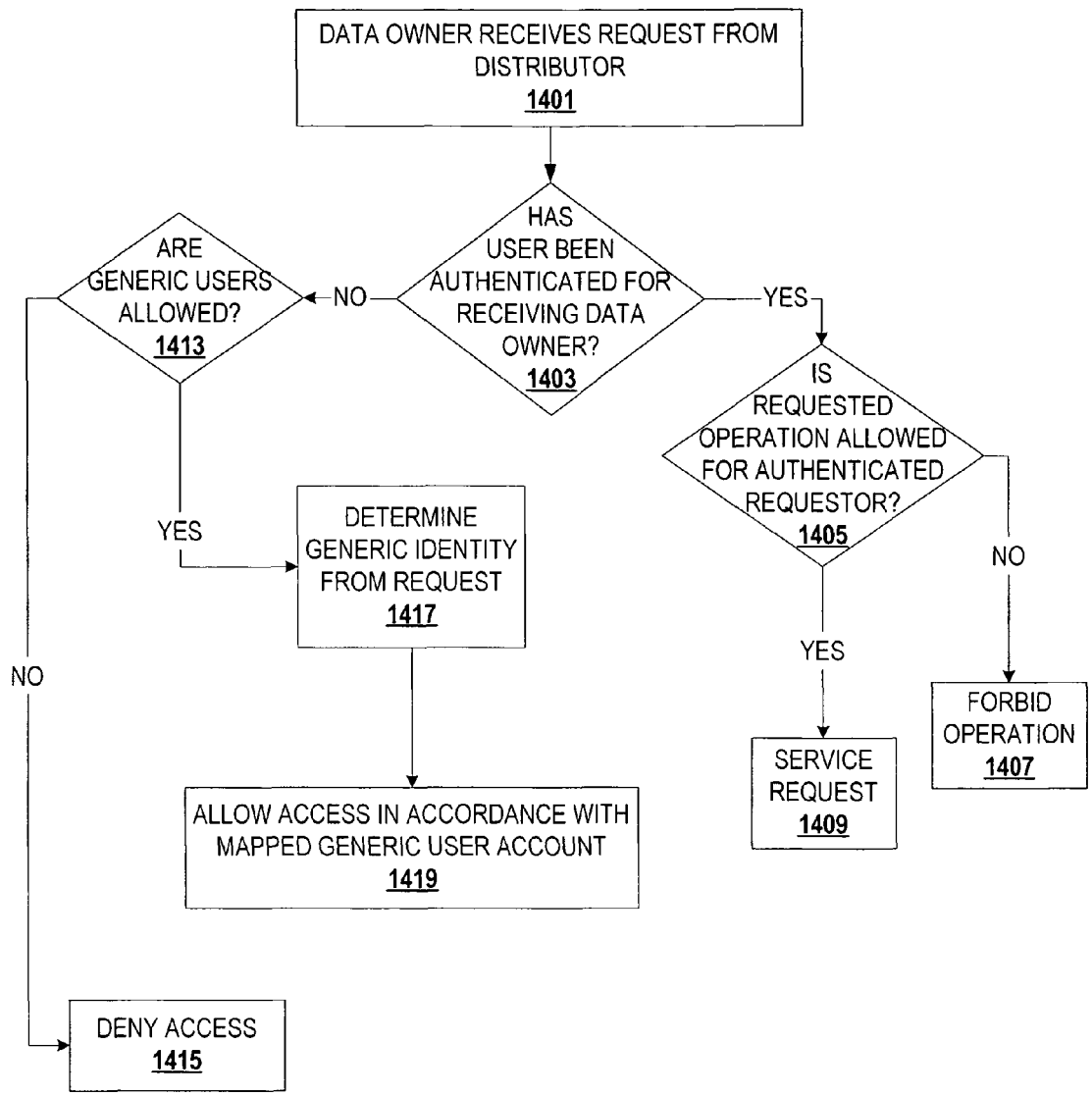
FIG. 14 depicts a flowchart for controlling access based on generic account mapping and requested operation according to some realizations of the invention.

FIG. 14 depicts a flowchart for controlling access based on generic account mapping and requested operation according to some realizations of the invention. At block 1401, the data owner receives a request from a directory distributor. At block 1403, it is determined if the user has been authenticated for the receiving data owner. If the user is not authenticated for the receiving data owner, then control flows to block 1405. If the user has been authenticated for the receiving data owner, then control flows to block 1413.

At block 1405, it is determined if the requested operation is allowed for the authenticated requester. If the requested operation is not allowed, then control flows to block 1407. If the requested operation is allowed, then control flows to block 1409.

At block 1413, it is determined if generic users are allowed. If generic users are allowed, then control flows to block 1417. If generic users are not allowed, then control flows to block 1415.

At block 1415, access is denied.

At block 1417, generic user identity is determined from the request. For example, the data owner or backend set processes the request as if requested by the generic identity indicated in the control in accordance with the proxied authorization control field of the request instead of processing the request as if received from the authenticated requester. At block 1419, the requestor is allowed access in accordance with the generic identity's privileges.

While the flow diagrams show a particular order of operations performed by certain realizations of the invention, it should be understood that such order is exemplary (e.g., alternative realizations may perform the operations in a different order, combine certain operations, overlap certain operations, perform certain operations in parallel, etc.). For example, additional operations may be performed to load balance a request over multiple suppliers in a data complex. For example, in FIG. 12, the load balancer may indicate the generic identity by default and set a flag if the relevant data owner is not the authenticating data owner. With respect to FIG. 14, block 1413 may not be performed. Instead, the control may flow from block 1417 to block 1405.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other type of medium suitable for storing electronic instructions.

Figure 15:
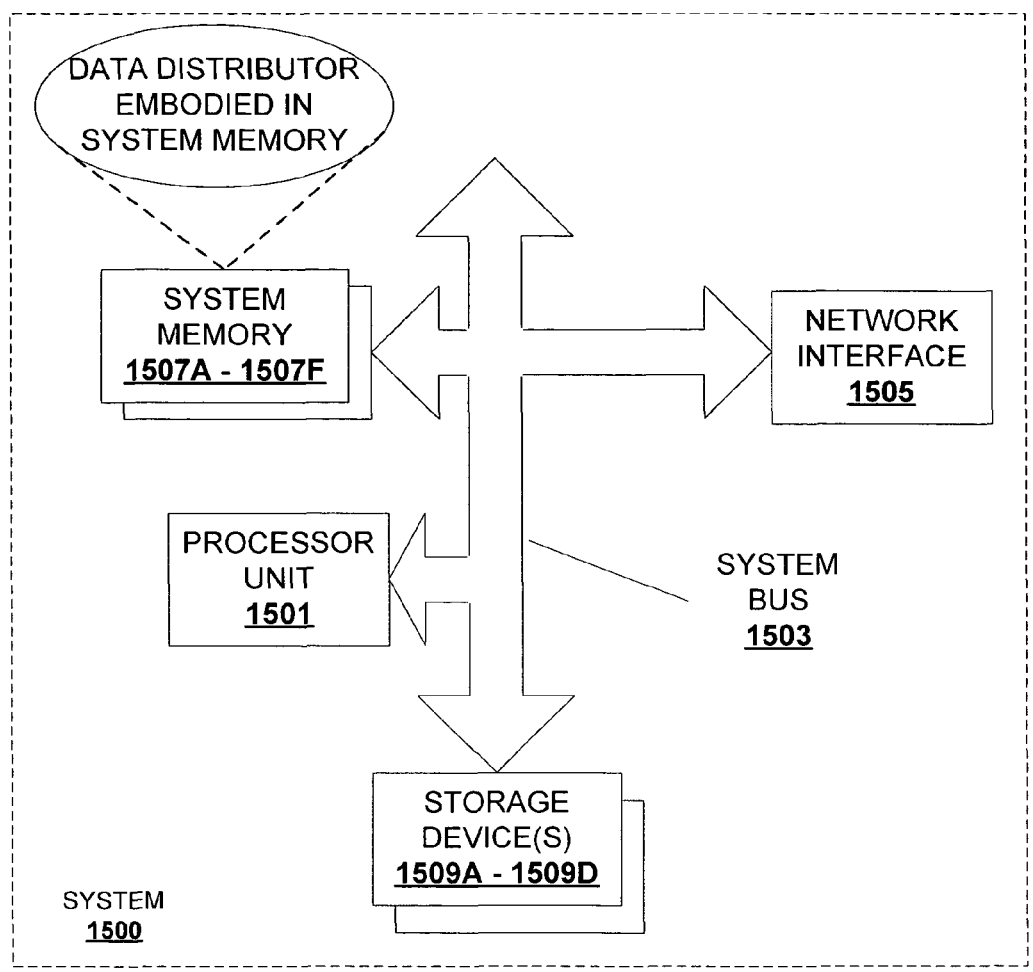
FIG. 15 depicts an exemplary system according to some realizations of the invention.

FIG. 15 depicts an exemplary system according to some realizations of the invention. A system 1500 includes a processor unit 1501 (possibly including multiple processors), system memory 1507A-507F (e.g., one or more of cache, SRAM DRAM, RDRAM, EDO RAM, DDR RAM, EEPROM, etc.), a system bus 1503 (e.g., LDT, PCI, ISA, etc.), a network interface 1505 (e.g., an ATM interface, an Ethernet interface, a Frame Relay interface, etc.), and a storage device(s) 1509A-1509D (e.g., optical storage, magnetic storage, etc.). Realizations of the invention may include fewer or additional components not illustrated in FIG. 15 (e.g., video cards, audio cards, additional network interfaces, peripheral devices, etc.). The processor unit 1501, the storage device(s) 1509A-1509D, the network interface 1505, and the system memory 1507A-1507F are coupled to the system bus 1503. The system memory 1507A-1507F embodies a directory distributor. Although FIG. 15 illustrates the directory distributor embodied in the system memory, various realizations of the invention implement the directory distributor differently (e.g., firmware, dedicated hardware, instantiation of one or more programs stored on the storage devices or another machine-readable medium, etc.).

While the invention has been described with reference to various realizations, it will be understood that these realizations are illustrative and that the scope of the invention is not limited to them. Many variations, modifications, additions, and improvements are possible. For example, while much of the description herein has focused on the illustrative context of a directory distributor processing requests for a directory namespace backend, balancing requests across multiple directory distributors is also envisioned. Similarly, although individual read and write requests or single requests are presumed, techniques described herein may be generally applied to batch requests and hybrid requests. For example, based on the description herein, persons of ordinary skill in the art will appreciate decoding a hybrid read/write request into separate requests for appropriate routing.

More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed:

1. A method of processing directory requests for a distributed directory namespace, the method comprising:
    decoding at least part of a directory request to determine a value that corresponds to a distribution criteria, wherein sets of leaf objects having a same directory path in the directory namespace are distributed over separate stores in accordance with the distribution criteria;
    determining an appropriate one or more of the separate stores based at least in part on the value; and forwarding the directory request according to the determined appropriate one or more separate stores.

2. The method of claim 1 wherein determining the appropriate one or more separate stores is also based on the directory request's type.

3. The method of claim 2 wherein the appropriate one or more of the separate stores host a master copy of their corresponding leaf objects and the appropriate one or more of the separate stores host one or more replicates of the master copy.

4. The method of claim 1 further comprising broadcasting a second directory request to the separate stores if the second directory request does not indicate a second value that corresponds to the distribution criteria.

5. The method of claim 1 wherein the directory request includes one of a read type directory request and a write type directory request.

6. The method of claim 5 wherein the directory request is a write type directory request, the method further comprising:
    receiving a read type directory request that corresponds to the write type directory request; and directing the directory request to the one of the separate stores that services the write type directory request.

7. The method of claim 1 wherein a requestor is authenticated to a first of the separate stores based on the requestor's identity that is represented in the first store, and authenticated to a second of the separate stores based on a generic identity mapped to the authenticated requestor's identity, wherein the generic identity is represented in the second store.

8. The method of claim 1 wherein the directory namespace is implemented as a directory information tree.

9. The method of claim 8 wherein the directory information tree is accessed in accordance with one or more standards including lightweight data access protocol and X.500.

10. The method of claim 1 wherein the distribution criteria includes one or more of attributes of the directory namespace and attributes of the leaf objects.

11. The method of claim 1 wherein determining the appropriate one or more of the separate stores includes hashing the value and looking up the appropriate one or more of the separate stores based at least in part on the hashed value.

12. The method of claim 1 wherein the directory namespace corresponds to one or more of electronic mail addresses, personnel information, phone numbers, assets, and security information.

13. The method of claim 1 embodied in a computer program product encoded on one or more machine-readable media.

14. A computer-readable storage medium, storing an application that, when executed:
    directs directory requests to respective ones of separate stores that represent different sets of leaf objects of a directory namespace hierarchy, based at least in part on a distribution criteria, determined at least in part based on the directed directory requests, wherein the different sets of leaf objects have a same directory path in the directory namespace hierarchy and the different leaf objects of the directory namespace hierarchy are distributed among the separate stores according to the distribution criteria.

15. The computer-readable storage medium of claim 14, wherein the application, when executed, further broadcasts to the separate stores directory requests that do not indicate a value corresponding to the distribution criteria.

16. The computer-readable storage medium of claim 14 wherein the directory requests include read type directory requests and write type directory requests.

17. The computer-readable storage medium of claim 16, wherein the application, when executed, further directs read type directory requests to those respective ones of the separate stores representing replicated copies of the corresponding leaf objects.

18. The computer-readable storage medium of claim 16, wherein the application, when executed, further directs write type directory requests to those respective ones of the separate stores representing master copies of the corresponding leaf objects.

19. The computer-readable storage medium of claim 14, wherein the application, when executed, further tracks direction of write type directory requests and directs read type directory requests according to the tracking.

20. The computer-readable storage medium of claim 19, wherein the application, when executed, further maintains the tracking for the write type requests for their respective time periods corresponding to propagation delay for replication of write type requests.

21. The computer-readable storage medium of claim 19, wherein the application, when executed, further maintains the tracking for the write type requests until acknowledgment of replication completion of the respective write type requests.

22. The computer-readable storage medium of claim 14 wherein a requestor is authenticated to a first of the separate stores based on the requestor's identity that is represented in the first store, and authenticated to a second of the separate stores based on a generic identity mapped to the authenticated requestor's identity, wherein the generic identity is represented in the second store.

23. The computer-readable storage medium of claim 14 wherein the directory namespace hierarchy is implemented as a directory information tree (DIT).

24. The computer-readable storage medium of claim 23 wherein the DIT is implemented in accordance with one or more standards that include X.500 and lightweight data access protocol.

25. The computer-readable storage medium of claim 14 wherein the separate stores includes one or more of separate memory, separate directory servers, and separate storage devices.

26. The computer-readable storage medium of claim 14 wherein the application includes a proxy application, a directory service application, and a network protocol application.

27. The computer-readable storage medium of claim 14, wherein the application, when executed, further broadcasts directory requests to the separate stores if the distribution criteria cannot be determined from the directory requests.

28. A method for servicing directory requests for a directory namespace, the method comprising:
   determining if a directory request indicates a value that corresponds to a distribution criteria of the directory namespace, wherein the directory namespace includes sets of leaf objects that are distributed among separate stores according to the distribution criteria, wherein the sets of leaf objects have a same directory path; and
   mapping the value to a first of the sets of leaf objects.

29. The method of claim 28 further comprising forwarding the directory request to a device that corresponds to one of the sets of leaf objects.

30. The method of claim 29 wherein the device includes a directory server and a load balancer that load balances for a group of directory servers.

31. The method of claim 28 further comprising:
   forwarding the directory request to a first of the separate stores that hosts a master copy of the first set of leaf objects if the directory request is a write type directory request; and forwarding the directory request to a second of the separate stores that hosts a replicate of the master copy if the directory request is a read type directory request.

32. The method of claim 28 further comprising forwarding the directory request to network device that load balances read type directory requests to a group of the separate stores that hosts a replicate of a master copy of the first set of leaf objects if the directory request is a read type directory request.

33. The method of claim 28 further comprising forwarding the directory request to network device that load balances write type directory requests to a group of the separate stores that host a master copy of the first set of leaf objects if the directory request is a write type directory request.

34. The method of claim 28 further comprising:
   forwarding the directory request according to the mapping, wherein the directory request is a write type directory request;
   determining that a first of the separate stores services the forwarded directory request; and
   forwarding a second directory request to the destination if the second directory request is a read type directory request for the first set of leaf objects.

35. The method of claim 28 further comprising authenticating a requestor to a first of the separate stores based on the requestor's identity that is represented in the first store, and authenticating to a second of the separate stores based on a generic identity mapped to the authenticated requestor's identity, wherein the generic identity is represented in the second store.

36. The method of claim 28 wherein the mapping includes hashing an attribute value of the directory request.

37. The method of claim 28 wherein the mapping comprises:
   hashing the attribute value; and
   looking up the first set of leaf objects with the hashed attribute value.

38. The method of claim 28 embodied in a computer program product encoded on one or more machine-readable media.

39. The method of claim 28 wherein the sets of leaf objects indicate information including one or more of E-mail addresses, security information, and phone numbers.

40. A method comprising:
   determining an appropriate one of a plurality of sets of leaf objects of a directory namespace for a directory request, the leaf objects of at least two of the plurality of sets of leaf objects having a same path in a directory namespace hierarchy, wherein each of the plurality of sets of leaf objects corresponds to a different one of a plurality of devices; and
   forwarding the directory request to a first of the plurality of devices that corresponds to the determined appropriate one of the plurality of sets of leaf objects, wherein correspondence between individual ones of the plurality of sets of leaf objects and the different ones of the plurality of devices is based at least in part on a distribution criteria.

41. The method of claim 40 wherein the distribution criteria includes one or more of a leaf object attribute, a directory namespace attribute, and a user defined attribute.

42. The method of claim 40 wherein determining the appropriate one of the plurality of sets of leaf objects comprises hashing an attribute value of the directory request to generate an index value that corresponds to the appropriate set of leaf objects.

43. The method of claim 40 wherein the plurality of devices includes directory servers, network security devices, load balancers, storage devices, and memory devices.

44. The method of claim 40 wherein the first device corresponds to a master copy of the determined appropriate one of the plurality of leaf objects if the directory request is a write type directory request and to a replicate of the master copy if the directory request is a read type directory request.

45. The method of claim 40 wherein the directory namespace is implemented as a directory information tree.

46. The method of claim 45 wherein the directory information tree is implemented in accordance with one or more standards including lightweight data access protocol and X.500.

47. The method of claim 40 wherein the directory request is a write type directory request, the method further comprising forwarding read type directory requests for the determined appropriate one of the plurality of sets of leaf objects to the first device.

48. The method of claim 47 wherein the read type directory requests for the determined appropriate one of the plurality of sets of leaf objects are forwarded to the first device for a time period that relates to propagation delay.

49. The method of claim 47 wherein the read type directory requests for the determined appropriate one of the plurality of sets of leaf objects are forwarded to the first device until acknowledgment of replication completion.

50. The method of claim 40 wherein determining the appropriate one of the plurality of sets of leaf objects is based at least in part on a distribution criteria value of the directory request that corresponds to a distribution criteria, which is at least part of the basis for distribution of the plurality of sets of leaf objects.

51. The method of claim 50 further comprising:
receiving a second directory request; and
broadcasting the second directory request if a distribution criteria of the second directory request cannot be determined.

52. The method of claim 40 embodied in a computer program product encoded on one or more machine-readable media.

53. An apparatus comprising:
a set of one or more processors; and
a means for associating directory requests with corresponding ones of a plurality of separately stored sets of leaf objects, at least two sets of the plurality of sets of leaf objects having a same path in a directory namespace.

54. The apparatus of claim 53 wherein the plurality of sets of leaf objects is stored separately in accordance with a distribution criteria.

55. The apparatus of claim 54 further comprising means for broadcasting those directory requests that do not indicate the distribution criteria.

56. The apparatus of claim 53 further comprising means to forward write type directory requests to devices that correspond to master copies of associated sets of leaf objects and read type directory requests to devices that correspond to replicates of the master copies.

57. The apparatus of claim 53 further comprising means to map a requestor's authenticated identity to a generic identity, wherein the requestor's identity is authenticated to a first device and the generic identity is represented in a second device that does not represent the requestor's identity.

58. A computer readable storage media including a computer program, the computer program comprising:
a first sequence of instructions to receive a directory request for a directory namespace; and
a second sequence of instructions to direct the directory request to one of a plurality of separate stores, based at least in part on a value that corresponds to a distribution criteria, wherein the directory namespace includes a plurality of leaf objects, which have a same directory path in the directory namespace, distributed over the plurality of separate stores based at least in part on the distribution criteria.

59. The computer readable storage media of claim 58, wherein the computer program product includes the second sequence of instructions to broadcast to the separate stores directory requests that do not indicate a distribution criteria value.

60. The computer readable storage media of claim 58, wherein the computer program product includes the second sequence of instructions to distinguish read type directory requests and write type directory requests, and forward the write type directory requests to those of the separate stores that host master copies of their corresponding ones of the plurality of leaf objects and the read type directory requests to those of the separate stores that host replicates of the master copies.

* * * * *